US012490016B2

(12) United States Patent
Tsun

(10) Patent No.: US 12,490,016 B2
(45) Date of Patent: Dec. 2, 2025

(54) METHOD AND SYSTEM FOR PROVIDING AUDIO OUTPUT WITH THREE-DIMENSIONAL (3D) SURROUND SOUND AND ULTRA BASS SENSATION VIA A MULTIPLE AUDITORY PATHWAY EARPHONE

(71) Applicant: Sin Man Samuel Tsun, Hong Kong (CN)

(72) Inventor: Sin Man Samuel Tsun, Hong Kong (CN)

( * ) Notice: Subject to any disclaimer, the term of this patent is extended or adjusted under 35 U.S.C. 154(b) by 202 days.

(21) Appl. No.: 18/220,831

(22) Filed: Jul. 12, 2023

(65) Prior Publication Data

US 2025/0024192 A1 Jan. 16, 2025

(51) Int. Cl.
*H04R 1/24* (2006.01)
*B06B 1/10* (2006.01)
*H04R 1/10* (2006.01)

(52) U.S. Cl.
CPC ............. *H04R 1/24* (2013.01); *H04R 1/1075* (2013.01); *B06B 1/10* (2013.01); *H04R 2460/13* (2013.01)

(58) Field of Classification Search
CPC .... H04R 1/24; H04R 1/1075; H04R 2460/13; B06B 1/10
See application file for complete search history.

(56) References Cited

U.S. PATENT DOCUMENTS

2012/0020501 A1 1/2012 Lee
2023/0404440 A1* 12/2023 Melman ................ A61B 5/125

FOREIGN PATENT DOCUMENTS

KR 20190110389 * 9/2019

OTHER PUBLICATIONS

Machine translation of KR 20190110389 Ho et al.; Earphone Assembled Aero Conduction Transducer and Bone Conduction Transducer (Year: 2019).*

* cited by examiner

*Primary Examiner* — Andrew Sniezek
(74) *Attorney, Agent, or Firm* — JW Law Group; James M. Wu

(57) ABSTRACT

A multiple auditory-pathway ("MAP") earphone, coupled to an external electronic system for converting electrical signals to audio sound, includes an earpiece, a first sound driver, and a second sound driver. In one aspect, the MAP earpiece is configured to be inserted into an ear canal for providing audio sound. The first sound driver is operable to generate a vibration output capable of facilitating audio hearing of a user through an auditory pathway via a portion of ear cartilage. The second sound driver is configured to generate a sound output facilitating the audio hearing of the user through another auditory pathway via user's ear drum.

19 Claims, 18 Drawing Sheets

1100

1200

METHOD AND SYSTEM FOR PROVIDING AUDIO OUTPUT WITH THREE-DIMENSIONAL (3D) SURROUND SOUND AND ULTRA BASS SENSATION VIA A MULTIPLE AUDITORY PATHWAY EARPHONE

FIELD

The exemplary embodiment(s) of the present invention relates to the field of electronical equipment for smart phones, computers, TV, handheld consoles, radios, and the like. More specifically, the exemplary embodiment(s) of the present invention relates to earphones or earbuds for audio broadcasting.

BACKGROUND

Conventional ear phones or earphones, also known as earbuds or in-ear headphones, are small audio devices capable of converting electrical signals or energy into sound frequencies or waves for audio output. A typical earphone can be designed to fit inside an ear canal or be worn by a user via inserting into the ear. For example, the earphones are typically connected to an audio source such as a smartphone, tablet, computer, or MP3 player via a wire or wireless Bluetooth connection.

Since earphones are generally compact, lightweight, and highly portable, they are a popular selection for noise cancellation and listening to various forms of media, including music, news, concerts, sports games, movies, and video games. Conventional earphones typically have various limitations or drawbacks, such as, but not limited to, lack of spatial audio sound, lack of surround sound audio, lack of bass, and the like. Furthermore, hearing impaired or deaf people usually cannot use conventional earphones.

As such, there is a need to have a hearing aid friendly earphone capable of providing audio spatial effects and 3D surround sound.

SUMMARY

On embodiment of the presently claimed invention discloses a multiple auditory-pathway ("MAP") earphone coupling to an external electronic system for receiving audio input signals. The MAP earphone includes an earpiece, a first sound driver, and a second sound driver. In one aspect, the earpiece is configured to be inserted into an ear canal for providing audio sound. The first sound driver is operable to generate a vibration output capable of facilitating audio hearing by a user through a newly discovered auditory pathway, also known as a new auditory pathway, via a portion of ear cartilage. The second sound driver is configured to generate a sound output facilitating the audio hearing by the user through another auditory pathway via user's ear drum. The first sound driver can produce audio output, mechanical output, and vibration output, while the second sound driver can generate only audio output. The vibration output transmits a signal through the newly discovered auditory pathway via a portion of ear cartilage lining the ear canal. The audio output and the mechanical output relay audio through another auditory pathway via the user's ear drum.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
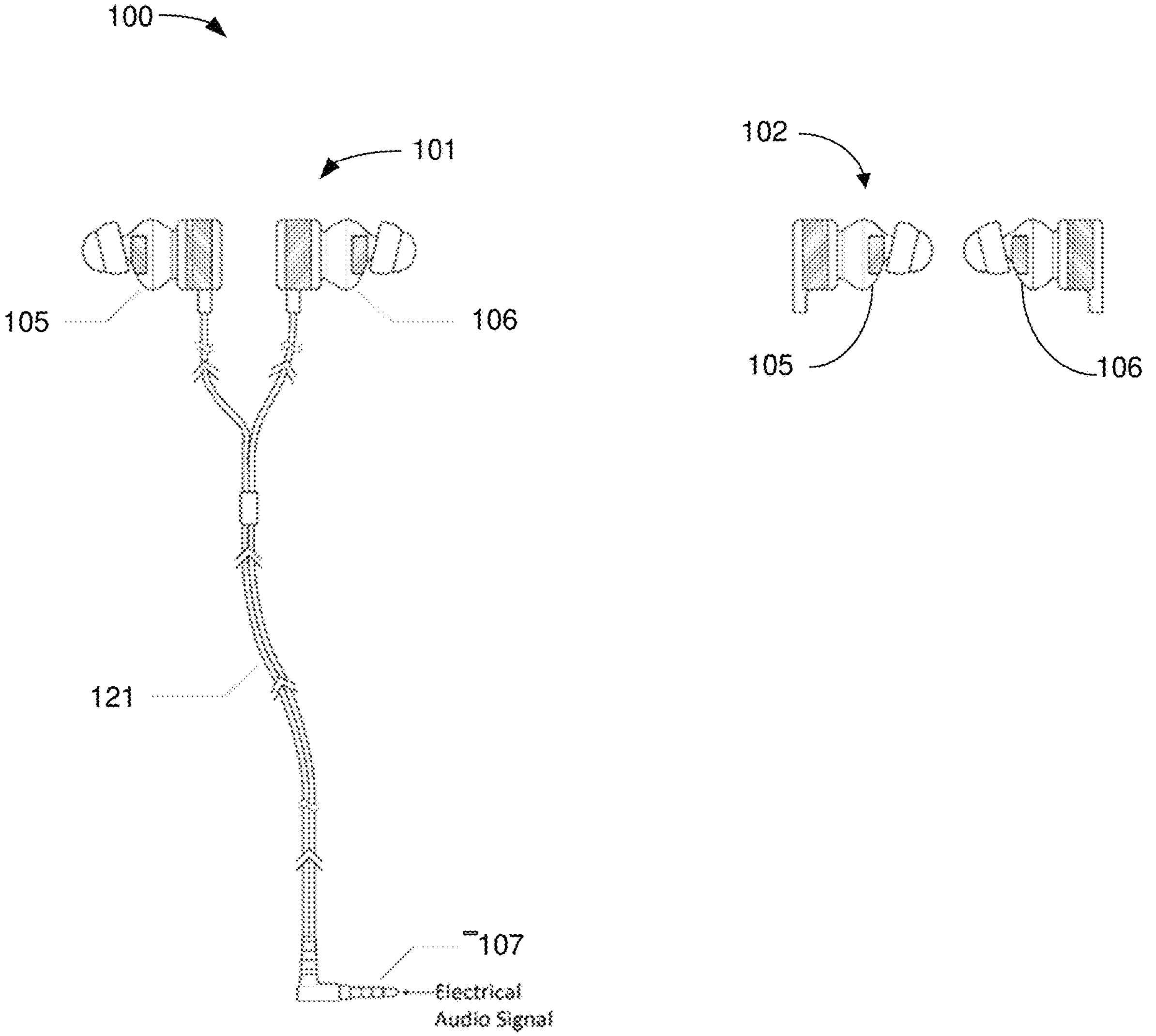
FIG. 1 illustrates a diagram showing both a corded and cordless set of MAP earphones capable of delivering the different types of outputs through different auditory pathways to create the sound illusion in accordance with one embodiment of the present invention.

Embodiments of the present invention disclose methods and/or apparatuses for providing a three-dimensional ("3D") audio output and ultra-bass effects through a multiple auditory-pathway ("MAP") earphone. MAP earphones can produce different types of audio output and the vibration output at the same time. When 2 auditory pathways receive different signals to the auditory receiving centers at the same time, the brain will create a sound illusion of a three-dimensional ("3D") audio output with ultra-bass effects.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all features or routines of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the presently claimed invention discloses a multiple auditory-pathway ("MAP") earphone which is coupled to an external electronic system for converting electrical signals into various types of audio and vibration outputs that signal to various auditory pathways at the same time. The MAP earphone includes an earpiece, a first sound driver, and a second sound driver. In one aspect, the earpiece is configured to be inserted into an ear canal for providing audio sound. The first sound driver can produce audio output, mechanical output, and vibration output, while the second sound driver can generate only audio output. The vibration output transmits a signal through the newly discovered auditory pathway via a portion of ear cartilage lining the ear canal. The audio output and the mechanical output relay audio through another auditory pathway via the user's ear drum.

For example, the MAP earphone includes a first sound driver and a second sound driver for facilitating generation of 3D audio output with ultra bass sensation through multiple auditory pathways. The first sound driver, in one aspect, produces audio output, mechanical output and the vibration output. The second sound driver generate the audio output. The vibration output, in one embodiment, facilitates audio hearing by a user through a new auditory pathway via a portion of ear cartilage. The audio output and the mechanical output facilitate generation of audio hearing by the user through another auditory pathway via user's ear drum. To provide ultra bass sound effect, the MAP earphone produces different types of audio outputs and vibration output concurrently via multiple auditory pathways. For example, when two (2) auditory pathways of a listener receive different signals simultaneously, the listener brain may likely create a sound illusion which have the effects of a 3D audio output with ultra-bass sensation.

FIG. 1 illustrates diagram 100 showing a corded and cordless set of MAP earphones 101-102 capable of delivering auditory and vibrational output in accordance with one embodiment of the present invention. MAP earphone 101 is a corded, cable, or wired MAP earphone 101 capable of providing auditory and vibrational output. MAP earphone 102 is functionally similar to the MAP earphone 101 that is cordless or wireless. In one aspect, MAP earphone 101 includes a right receiver 105, left receiver 106, cord or cable 121, and an electrical audio signal 107. MAP earphone 102 includes a right receiver 105 and a left receiver 106. In another aspect, MAP earphone 102 has a built-in wireless communication circuit or component. It should be noted that the underlying concept of the exemplary embodiment(s) of the present invention would not change if one or more components (circuit or elements) were added to or removed from FIG. 1.

MAP earphone 101 or 102, also known as ultra-bass Metaverse earphone, is able to play music, radio stations, audio output from video broadcastings, television broadcasting, real-time sport events, interactive conversation, et cetera. The auditory and vibrational output from MAP earphone 101 or 102 to different auditory pathways in the human brain results in a 3D surround-sound sensation which can enhance listening enjoyment. Referring to FIG. 1, MAP earphone 101 includes 2 pieces of right and left receivers 105-106. Electrical audio signals are received by MAP earphone 101 via an electrical audio input 107 which is coupled to receivers 105-106 via a connecting cable 121. For example, a printed circuit board in MAP earphone 101 is used for signal transmission. MAP earphone 102, in one aspect, includes a wireless transmission component for handling wireless signal transmission. It should be noted that wireless transmission includes, but is not limited to, Bluetooth, Wi-Fi, Zigbee, microwave transmission, cellular transmission, and the like.

MAP earphone 101 or 102, in one example, is constructed by combing multi-drivers with chamber effects which create a lot of sound effects that greatly enhance listening and/or hearing enjoyment. An advantage of employing MAP earphone 101 or 102 is to increase hearing enjoyment such as ultra-bass and real bass performance, spatial and surround audio effects through the earphone. It should be noted that left receiver 106 of MAP earphone 101 or 102 should be the same appearance and construction as right receiver 105.

Figure 2A:
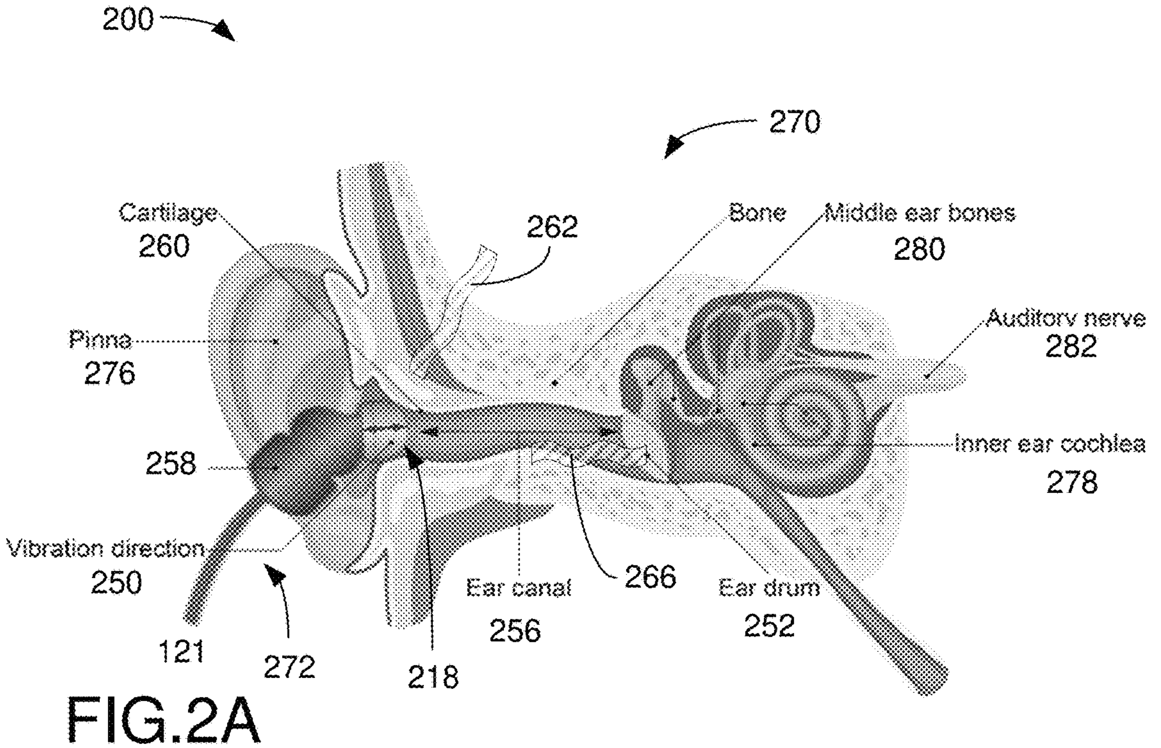
FIGS. 2A-2B are diagrams illustrating an exemplary MAP earphone inserted in an ear in accordance with one embodiment of the present invention.

FIG. 2A is a diagram 200 illustrating an exemplary MAP earphone inserted in an ear showing contacting points associated to an ear in accordance with one embodiment of the present invention. Diagram 200 illustrates a user ear 270 and MAP earphone 272 wherein MAP earphone 272 is plugged into the user's ear between the ear cartilage 260 and ear canal 256. MAP earphone 272 includes a soft ear adaptor 218, housing 258, and cable 121. It should be noted that the underlying concept for the exemplary embodiment(s) of the present invention would not change if one or more components (circuit or elements) were added to or removed from FIG. 2A.

User ear 270 illustrates a normal human ear anatomy showing pinna 276, cartilage 260, ear canal 256, ear drum 252, inner ear cochlea 278, middle ear bones 280, auditory nerve 282. Upon coupling MAP earphone 272 to the user ear 270, MAP earphone 272 can generate audio sound 266 and vibration sound 262. Audio sound 266 is transmitted through the user's inner ear cochlea 278 via ear drum 252. Simultaneously, vibration 250 of cartilage 260 transmits a signal directly from the cartilage cells to the brain without passing through the normal auditory hearing system. This new auditory hearing system relays additional information that can be used to create sound illusions.

MAP earphone 272, in one embodiment, includes at least two sound drivers capable of generating different types of the audio and vibration outputs at the same time in different auditory pathways to the brain to create the 3D surround-sound and ultra-bass sensation. This is accomplished through two sensory pathways (audio and vibration) stimulated by a single source of electronic audio signals. For example, if one of the two sound drivers is used to generate a vibration with a predefined vibration direction for providing vibration sound, then another one of the two sound drivers can be configured to provide audio sound.

MAP earphone 272 is designed for a human ear. When worn by a user, MAP earphone 272 should be located at the entrance of ear canal near 256 ear pinna 276. The touching position or wearing position is at cartilage 260. The length of a human ear canal is usually around 1 inch ("in"). Beginning from the exterior of the ear, the first 2/5 of the ear canal are lined with soft tissue such as cartilage 260. The latter 3/5, stretching from the end of the cartilage 260 to the ear drum 252, is constructed exclusively from bone. The intended wearing position or touching position is against the cartilage of the ear canal. Thus, when worn correctly, the MAP earphone 272 should be positioned within the external 2/5 of the ear canal, resting against cartilage 260. Following the vibration direction 250, the MAP earphone 272 moves in and out in ear canal 256, creating a "rubbing process" which vibrates the cartilage 260, transmitting a new auditory signal to the brain. When these two auditory pathways simultaneously relay different signals to the auditory receiving centers, the brain will create a sound illusion of three-dimensional ("3D") audio output and ultra-bass effects.

MAP earphone 272 includes two receivers, each of which includes one MEV driver 230 and one or more audio drivers 240. In one aspect, MAP earphone is configured to combine sound outputs from multiple audio drivers 240 to enhance and/or optimize sound quality and sensation.

An advantage of employing MAP earphone 272 is the production of audio with enhanced bass and improved 3D surround sound that enhances virtual reproduction of real-world soundscapes.

Figure 2B:
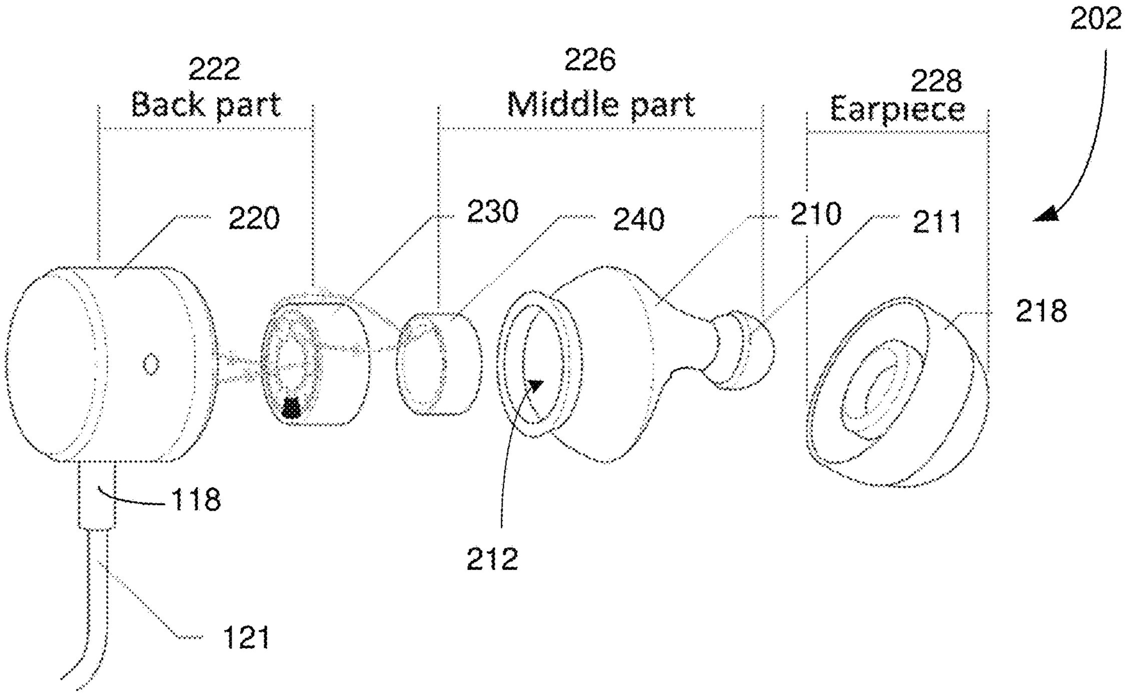

FIG. 2B is a diagram illustrating an exemplary MAP earphone 202 containing various components including at least two drivers in accordance with one embodiment of the present invention. MAP earphone 202 includes a back part 222, middle part 226, and earpiece 228 wherein back part 222 includes a mechanical-electromagnetic-vibration ("MEV") driver 230 and middle part 226 includes an audio driver 240. It should be noted that the underlying concept of the exemplary embodiment(s) of the present invention would not change if one or more components (circuit or elements) were added to or removed from FIG. 2B.

Back part 222, in one example, includes a back plastic cover 220, MEV driver 230, and cable connection 121. Back plastic cover 220 is a back cover of MAP earphone configured to house MEV driver 230 and cable connection 118 coupling to cable 121. In one aspect, MEV driver 230 includes an electromagnetic sound generator and mechanical sound generator. It should be noted that the electromagnetic sound generator is configured to produce an electromagnetic audio output and mechanical sound generator generates mechanical audio output as well as vibration output. Cable connection 118 is used to provide a connection between MEV driver 230 and a phone terminal, not shown in FIG. 2B. A function of phone terminal or plug is to transmit electrical audio signals from an audio source to MAP earphone.

Middle part 226 includes a front plastic cover 210, acoustic chamber 212, audio driver or device 240, and emission hole 211. Front plastic cover 210 is a seating place for a second audio device or devices 240 with resonation at acoustic chamber 212. A function of middle part 226 is to produce audio sound as indicated by numeral 266 through an emission hole 211 to reach listener through ear drum 252.

Front plastic cover 210 is a plastic cover used for protecting and/or housing second audio devices or driver 240 which produces resonant performance of MAP earphone 202. Front plastic cover 210 also facilitates a connection between MEV driver 230 and second audio devices 240. Emission hole 211 is located at the front portion of MAP earphone 202. It should be noted that emission hole's length and size will affect the resonant performance of MAP earphone 202. Acoustic chamber 212 is located inside of front plastic cover 210 and offers a seating place for second audio device or devices 240 for generation of resonant performance and sound production out of earpiece 228.

Audio driver or second audio device(s) 240 is positioned in front of MEV driver 230 with respect to a user ear when MAP earphone 202 is inserted into the user ear. Depending on the applications, one or more audio devices 240 can be installed in middle part 226. The number of audio devices used should affect frequency response curve and/or output of MAP earphone 202. Second audio device or audio driver

240 can be fabricated via electromagnetic type, piezoelectric type, dynamic type, mechanical type, armature type, or a combination of electromagnetic, piezoelectric, dynamic, mechanical, and/or armature type components. In one example, additional audio devices or drivers 240 can be employed to provide a full range of audio frequency.

Soft ear adaptor 218 is situated or located at the end of MAP earphone 202 and is used to directly contact the cartilage in a human ear canal. In one embodiment, soft ear adaptor 218 is constructed by a thin plastic layer allowing transmitting various vibration frequencies from MEV driver 230 to soft ear adaptor 218. It should be noted that size of soft ear adaptor 218 which is fitted in a user ear is critical in affecting performance of spatial and surround sound effects. For example, a user needs to select a suitable size of soft ear adaptor 218 based on dimension of user ear canal. If soft ear adaptor 218 plugging into user ear is too tight, the effects of audio output, for instance, would be too strong. If, however, the fitting between soft ear adaptor 218 and ear canal is too loose, the effects would be too weak. In operation, users need to try and select the right size for their ears to obtain the best performance.

Upon receipt of electrical audio signals, audio driver or drivers 240 generate at least in part frequency response as reaction flow. Audio driver 240, in one aspect, provides one channel or pathway of sound output of MAP earphone 202. For example, audio driver 240 is capable of providing audio output from mid to high range of audio frequency. The electrical audio input via cable 121 to MEV driver 230 and audio driver 240 are the same or similar with similar time domain and phase orientation.

Audio driver or drivers 240 include electromagnetic drivers, such as, but not limited to, electro-magnetic speakers, electro-magnetic receivers, dynamic speakers, dynamic receivers, miniature speakers, and miniature receivers. It should be noted that armature type or piezo type sound generators may be used by audio driver 240. Different types and numbers of additional audio devices will have different frequency response curves of MAP earphone 202. Note that audio driver 240 can be adjusted in resistance and/or impedance to match with audio and vibration outputs of MEV driver 230 to optimize audio output. It should be noted that the audio driver is configured to generate audio output to a usual auditory system.

MEV driver 230, also known as DB Koo ultra-bass driver, includes an electromagnetic sound generator and a mechanical sound generator. The electromagnetic sound generator and the mechanical sound generator, in one embodiment, share common parts. MEV driver 230, in one example, generates a vibration output from a series of vibration which leads vibrations at one or more contact points of user ear for creating a new auditory pathway. The vibration output generated by MEV driver 230 travels through a new auditory system to the user's brain to create sound illusions such as a 3D surround sound sensation. It should be noted that MEV driver 230 plus one or more additional audio drivers 240 are constructed in each receiver of MAP earphone 202.

In operation, upon receipt of an electrical audio input as audio source through a connecting cable 121, MEV driver 230 and audio driver 240 generate multiple audio outputs via multiple mechanisms originating from the single audio source. The multi-outputs or multiple audio outputs include at least an audio output and a vibration output. It should be noted that MAP earphone 202 can also receive electrical audio input via a wireless transmission through a wireless network.

The vibration output, in one example, generates a range of amplitude from minimum to maximum amplitudes and frequencies. The vibration output of MAP earphone 202 allows a user to listen audio sound through vibration and/or rubbing against the cartilage of a user ear. In one embodiment, the vibration output emits or broadcasts audio signals or sound to a user via a new auditory pathway of a human listening or hearing system. The advantage of providing vibration output is to stimulate user brain experiencing enhance hearing enjoyment and facilitate the generation of sound illusions.

To provide electrical audio input with multiple audio outputs, MAP earphone 202 employs at least one MEV driver 230 and at least one audio driver 240. MEV driver 230, in one embodiment, is configured to generate three (3) type of audio outputs in accordance with a single audio input. The first audio output is an electro-magnetic audio output generated through an electromagnetic mechanism using an electromagnetic sound generator. The second audio output is a mechanical audio output generated from a mechanical mechanism using a mechanical sound generator. The third mechanical output is a vibration output generated through a vibration mechanical mechanism using a mechanical sound generator. The vibration output produces the rubbing process in the user's ear canal cartilage, leveraging a newly discovered auditory pathway to create a 3D surround sound sensation.

Audio driver 240, also known as second audio device or devices, is used to compensate an additional range of audio output which MEV driver 230 does not cover. To provide a full-range audio performance, MAP earphone 202 employs at least one audio driver 240 to optimize audio output. Audio driver 240, in one example, can be electromagnetic type, piezoelectric type, dynamic type, mechanical type or armature type audio devices or components.

MAP earphone 202, in one embodiment, employs an earpiece 228, a first sound driver or MEV driver 230 and a second sound driver or audio driver 240 to convert electrical signals to various audio and vibration outputs that synchronously stimulate different auditory pathways to perform sound illusion. Earpiece 228, in one example, is fabricated with soft material so that when it is inserted into a user ear canal, earpiece 228 can transmit vibration output of audio sound via the soft material. Examples of suitable soft material include, but are not limited to: plastic, silicon, rubber, and/or a combination of plastic, silicon, metal, and/or rubber. In operation, soft ear adaptor 218 of earpiece 228 is configured to be fitted inside ear canal whereby the vibration of soft ear adaptor 218 against ear cartilage 260 allows the user to receive or hear vibration sound or output.

The first sound driver, in one embodiment, is MEV driver 230 coupled to earpiece 228 operable to generate a vibration output used for facilitating audio hearing by a user through a first auditory pathway 262 via at least a portion of ear cartilage 260. In one aspect, the first sound driver includes an electromagnetic sound generator configured to generate electromagnetic audio and a mechanical sound generator configured to generate mechanical sound. The mechanical sound generator, in one example, is configured to facilitate generation of the vibration output.

The second sound driver, in one embodiment, is audio driver 240 coupled earpiece 228 operable to generate a sound output as indicated by numeral 266 for facilitating broadcast of audio sound to listener through a second or typical auditory pathway via the user or listener's ear drum 252.

MEV driver 230, in one embodiment, includes various components including, but not limited to, a yoke component, a linear vertical vibrator, a moving diaphragm, and an audio calibration diaphragm for creating various audio and vibration outputs that utilize different auditory pathways to perform sound illusion. The yoke component, for example, includes at least one pin armature, magnet, and mass unit for facilitating sound generation. The linear vertical vibrator includes at least one pin armature lock, mechanical spring hole, dust cover, and yoke seating place for facilitating sound generation.

MAP earphone 202, in one embodiment, further includes a receiver configured to receive electrical audio input. While the receiver can be configured to receive electrical sound signals via a cable, it can also be configured to receive electrical signals via a wireless network.

An advantage of using MAP earphone is that through creating different audio and vibration outputs, different auditory pathways are simultaneously stimulated, resulting in sound illusion of enhanced bass effects that improve audio reality or on-site performance of content. Another advantage of using MAP earphone is to provide spatial audio effects which can be used to create illusions of direction, size, and movement of sound. This may be used, for instance, to generate the feel of a 360-sound field or 3D surround sound.

Figure 3:
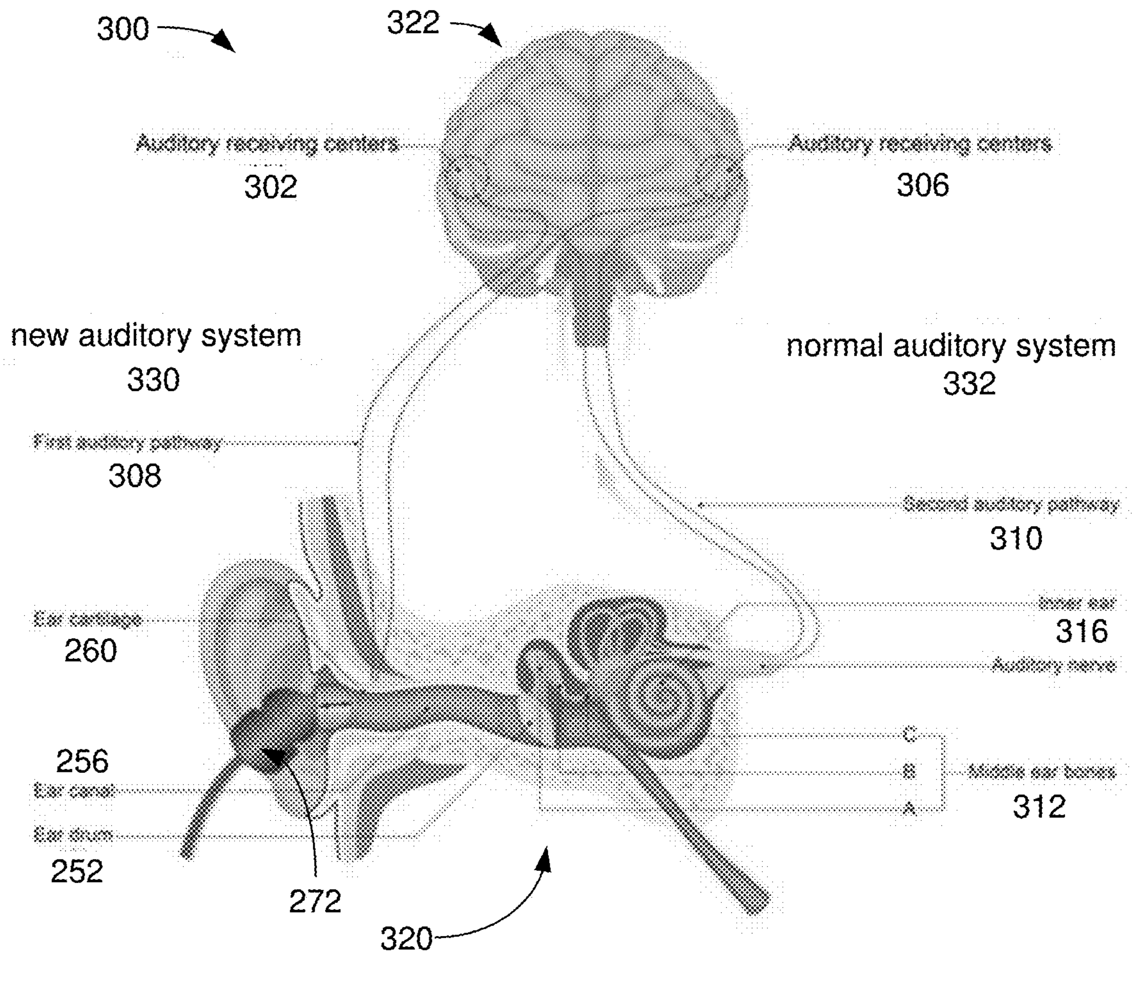
FIG. 3 is a diagram illustrating auditory pathways associated to an MAP earphone in accordance with one embodiment of the present invention.

FIG. 3 is a diagram 300 illustrating auditory pathways associated to an MAP earphone in accordance with one embodiment of the present invention. Diagram 300 shows MAP earphone 272, ear anatomy 320, and brain anatomy 322. Ear anatomy 320 and brain anatomy 322, in one embodiment, are coupled by a first and a second auditory pathways 308-310. It should be noted that the underlying concept of the exemplary embodiment(s) of the present invention would not change if one or more anatomies (or elements) were added to or removed from FIG. 3.

Diagram 300 illustrates a new auditory system 330 and a normal auditory system 332 wherein new auditory system 330 includes first auditory pathway 308 and normal auditory system 332 contains second auditory pathway. A function of MAP earphone 272 is to involve both systems 330-332 to generate new listening or sound sensation(s). In the human hearing system, one or more auditory systems receive and/or transmit sound waves to parts of the brain such as the auditory receiving centers 302-306 for differentiating patterns of neural activity. The identified patterns of neural activities are subsequently integrated with inputs from other sensory systems to guide behavior such as orienting movements due to acoustic stimuli and intraspecies communication.

An auditory system, in one example, includes ear pinna, ear canal 256, ear drum 252, 3 inner ear bones 312, and inner ear 316. In one aspect, MAP earphone 272 is configured to stimulate newly discovered auditory system 330 which can detect vibration output of audio sound via rubbed or vibrating cells of cartilage 260. In operation, the vibration and rubbing process sends a signal to the brain through the new auditory pathway.

To enhance listening or hearing enjoyment with sound illusion, MAP earphone 272, in one embodiment, allows user's brain such as brain 322 to enjoy extraordinary sound sensation by providing multiple different sound outputs to two (2) auditory pathways 308-310. Note that generation of sound effect with real ultra-bass performance can be achieved via a small earpiece such as MAP earphone. It should be noted that through using multiple sound outputs to multiple auditory pathways, the MAP earphone 272 can achieve wider and fuller range of audio frequency with harmonics, creating more reality of sound. Note that new auditory system 330 is used to facilitate spatial audio effects.

An advantage of using MAP earphone is to produce analogue audio. For example, a listener hears sound which is not only transmitted from normal auditory system 332 but also from new auditory system 330 to reach brain 322. This may allow deaf or hearing-impaired people to experience the sound through an alternate auditory system 330.

To provide 3D surround sound, MAP earphone 272 employs necessary audio emissions to broadcast or stimulate both normal auditory system 332 and new auditory system 330. Auditory messages, in one example, are conveyed to the brain via two types of pathways, namely the primary auditory pathway such as second auditory pathway 310 which carries messages from the cochlea, and the non-primary pathway such as first auditory pathway 308 and/or reticular sensory pathway which carries sensory messages.

The normal auditory hearing system, also known as the normal auditory system 332, works as the usual hearing system wherein the listener can hear the sound through a collection of signals from the ear pinna, ear canal, 256, and ear drum 252. The movement of ear drum 252 leads to the movement of middle ear bones 312 which move the inner ear 316, stimulating the auditory nerve to transmit sound to brain via the normal auditory system 332.

MAP earphone 272 is configured to create vibration together with audio signal sources that form 2 sound outputs to brain. It should be noted that the linear movement against the ear canal cartilage provides a sound output to user via new auditory system 330. Due to multiple sound outputs by MAP earphone 272, the audio output will be transmitted to the brain via normal auditory system 332 and vibration output will be transmitted to the brain from new auditory system 330. An advantage of using both auditory systems 330-332 will assist deaf and/or hearing disable people for hearing. Another advantage of using MAP earphone 272 capable of broadcasting sound via both systems 330-332 is to create spatial audio or virtual reality audio in the applications of music, movie, game, e-sport, virtual reality application program, live program, and/or Metaverse related programs. The MAP earphone 272 can simultaneously produce different types of audio and vibration outputs that combine signals through different auditory pathways to the brain to provide ultra-bass effects, more audio reality, and/or onsite performance.

Figure 4A:
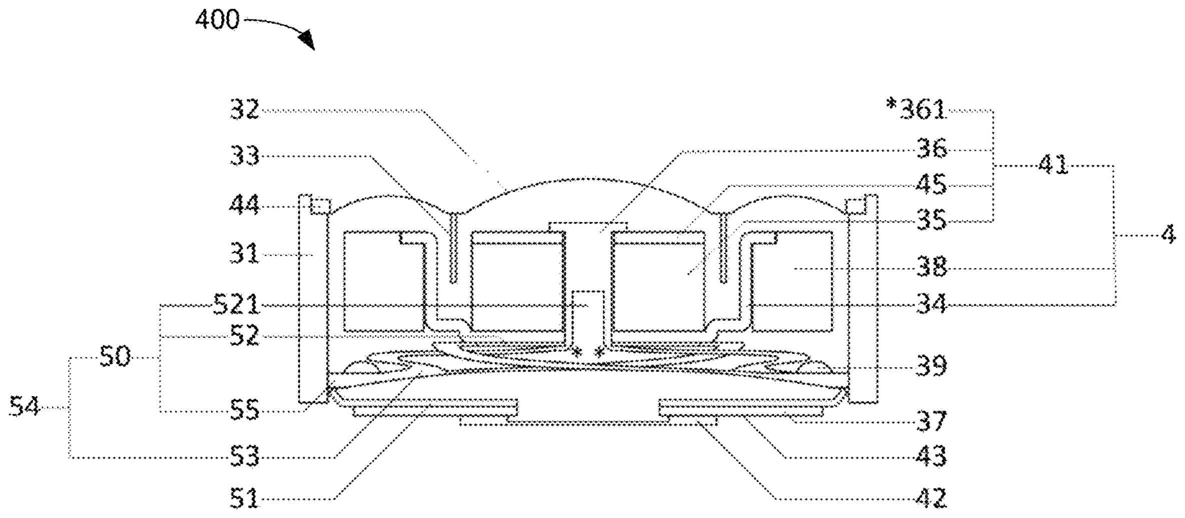
FIGS. 4A-4E are block diagram illustrating first driver of MAP earphone in accordance with one embodiment of the present invention.

FIG. 4A is a block diagram illustrating first driver 400 of MAP earphone containing various components in accordance with one embodiment of the present invention. First driver, also known as MEV driver 400 includes a yoke 4, liner vertical vibrator 54, bridge 31, moving diaphragm 32, and audio calibration diaphragm 42. It should be noted that the underlying concept of the exemplary embodiment(s) of the present invention would not change if one or more components (circuit or elements) were added to or removed from FIG. 4A.

In one embodiment, MEV driver 400 includes an electromagnetic sound generator which is based on an electromagnetic mechanism. The electromagnetic sound generator is able to generate vibration output produced from movement of moving diaphragm 32 which moves the air molecules for sound transmission. To construct or fabricate MEV driver 400, an enameled voice coil 33 is rounded as a cylindrical tube which is glued or coupled to a symmetric placement of moving diaphragm 32. Moving diaphragm 32 is configured to affect the efficiency of induced electromagnetic force on moving diaphragm 32 for moving air molecules to transmit sound. The material of enameled voice coil 33 can be made by copper ("Cu"), silver ("Ag"), Aluminum ("Al"), gold ("Au"), and/or a combination of Cu, Ag, Al, and/or Au as alloys for distinct acoustic results of the electromagnetic sound generator. The length of enameled voice coil 33 can affect DC resistance and/or impedance value.

The number of turnings and thickness of enameled voice coil 33 will affect resistance and impedance, while the resistance and impedance affect tone balance as well as frequency response curve between the electromagnetic sound generator and mechanical sound generator. Enameled voice coil 33 is assembled at the center, facilitating a balance of moving diaphragm 32 in a round cylindrically shape or any other shapes. Moving diaphragm 32 is coupled or glued at bridge 31 and assembled or attached to power ring 44 as a node of vibration. Enameled voice coil 33 is located between the gap between pin armature 36 and mass 38. Note that enameled voice coil 33 can affect magnetic field generated from magnet 35, which provides induced electromagnetic force. A gap between yoke 41 and mass 38 is used to facilitate movement of enameled voice coil 33 up and down for affecting induced electromagnetic force. A winding method and number of turns of enameled voice coil 33 can affect electromagnetic force in accordance with a three-hand rule. The depth of enameled voice coil 33 into the gap for the movement of enameled voice coil 33 up and down also affects the electromagnetic force. The thickness, shape, and material of moving diaphragm 32 can also be important factor because it can affect the resonant frequency and frequency response curve which will affect the sound output.

MEV driver 400, in one embodiment, is placed or constructed near the back of MPA earphone while the audio driver or drivers are placed or constructed near the emission hole of MAP earphone. It should be noted that the distance between MEV driver 400 and audio driver can be important because the distance can affect the sound performance of MEV driver 400. To provide multi-output surround sound, MEV driver 400 contains a free-floating momentum yoke 4 and linear vertical vibrator 54.

The MAP earphone, in one example, is configured to merge different mechanisms into a unit or earphone for saving space. For example, the MAP earphone, first, combines three (3) different types of sound output mechanisms in one MEV driver 400, and the merged sound is subsequently re-merged with audio outputs from the audio driver or drivers to perform sound illusions by simultaneously sending different audio and vibration outputs through different auditory pathways.

The mechanical sound generator is configured to activate vertical vibrator mechanical spring 50 to generate resonant frequency via vertical vibration and hit or strike momentum yoke 4 at the drum plate 39 to create mechanical audio. Linear vertical vibrator 54 is situated at the bottom of momentum yoke 4 fixed at the bottom part of the yokes 41 by pin armature lock 361. Linear vertical vibrator (54) is composed from the center plate for yoke seating place 52 which is fixed to momentum yoke 4. Spring legs 53 are used to control the elasticity of mechanical spring 50. It should be noted that the number, thickness, and design of spring legs 53 can affect amplitude, response time, and damping performance of the vibration generated by MEV driver 400. Spring legs 53, in one example, extends from spring edge 55 which is fixed at bridge 31 to the center at the mechanical spring hole (521).

The end of the spring legs (53) near bridge 31 has a metal ring called drum plate 39. At the lowest part of yoke bottom 41, also known as pin armature lock (361), a distance is created with drum plate 39. The distance of pin armature lock (361) and drum plate 39, in one example, is fixed to ensure proper clearance of linear vertical vibrator 54 so that linear vertical vibrator 54 can properly hit at the highest position. The position of drum plate 39 is below the bottom of moment yoke 4. The printed circuit board 37 is used to connect enameled voice coil 33 and the audio driver. The center of printed circuit board 37 is audio calibration diaphragm 42 which is used to assist tuning of frequency response for MEV driver 400.

An advantage of using a MEV driver 400 containing multiple different types of sound generators is to provide a compact earphone with extraordinary sound effect.

Figure 4B:
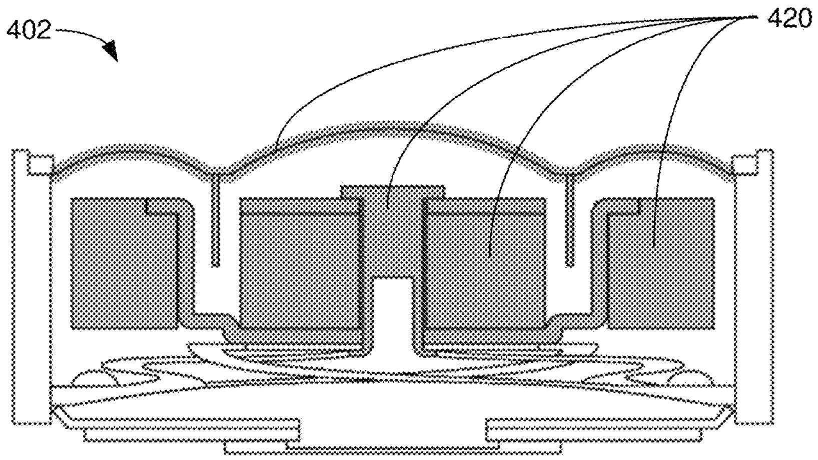
Figure 4C:
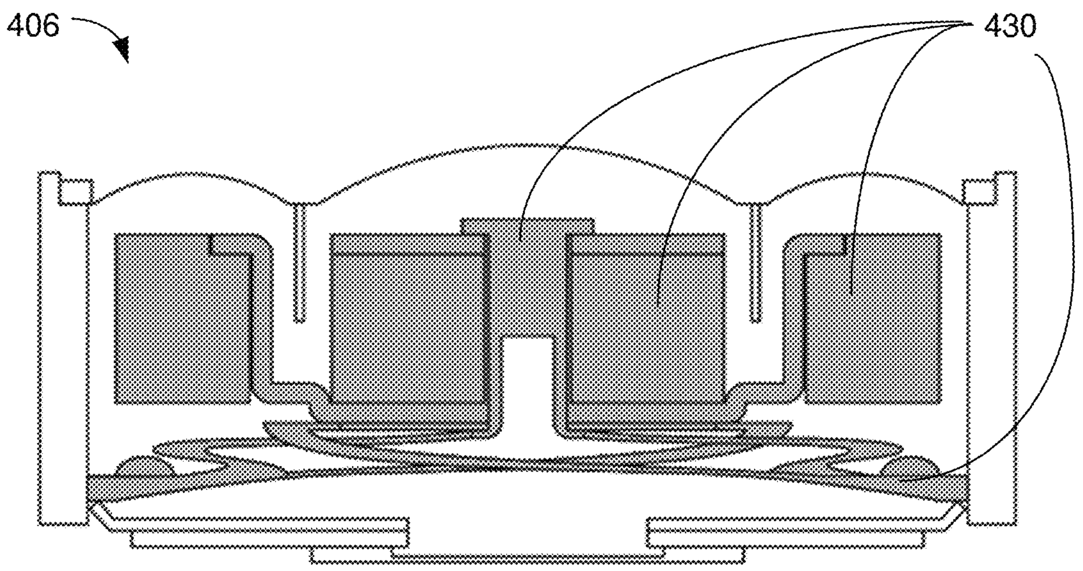

FIG. 4B is a block diagram illustrating various components of electromagnetic sound generator in first driver or MEV driver 402 of MAP earphone in accordance with one embodiment of the present invention. Diagram 402 illustrates components of an electromagnetic sound generator 420. FIG. 4C is a block diagram illustrating components of mechanical sound generator 430 in an MEV driver 406 of a MAP earphone in accordance with one embodiment of the present invention. It should be noted that the underlying concept of the exemplary embodiment(s) of the present invention would not change if one or more components (circuit or elements) were added to or removed from FIG. 4B or 4C.

Figure 4D:
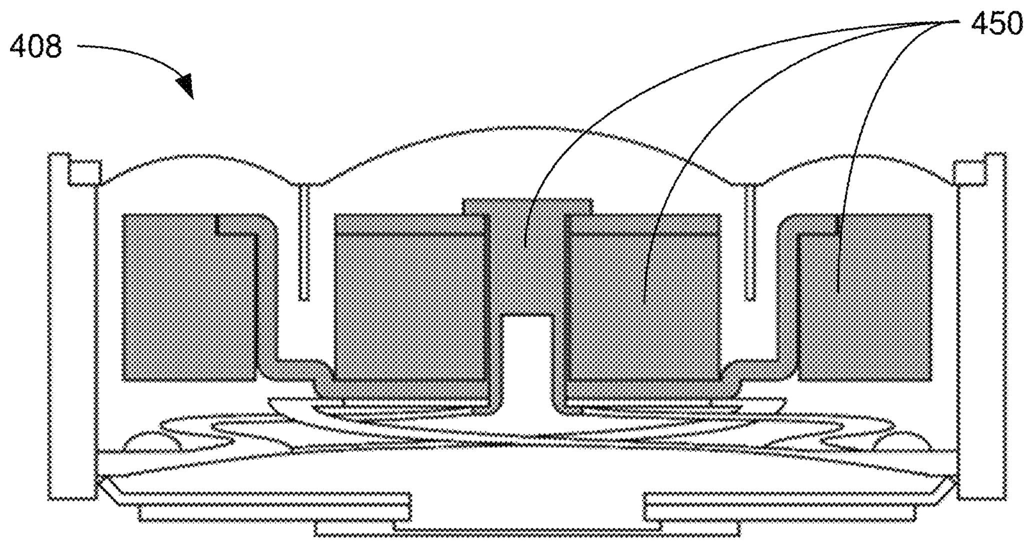

FIG. 4D is a block diagram illustrating common components 450 used by electromagnetic sound generator and mechanical sound generator in MEV driver of MAP earphone in accordance with one embodiment of the present invention. To create the sound illusion in a compact MAP earphone, MEV driver 408 uses various common parts or components 450 between the electromagnetic sound generator and the mechanical sound generator. MEV driver 408, in one embodiment, facilitates generation of at least one electromagnetic audio output, one mechanical audio output, and one vibration output concurrently in response to one electrical audio input.

Referring to FIG. 4A, the bottom of momentum yoke 4, in one example, is fixed via mechanical spring hole 521 which is locked by pin armature lock 361 of the mechanical sound generator. At the center of yoke 41, center pin armature 36 is surrounded by magnet 35 which provides the magnetic field for the electromagnetic sound generator. Center pin armature 36, in one example, is made of copper. A purpose of center pin armature 36 is to support magnet 35. Magnet 35 can be utilized together with permanent magnet including soft magnetic material which can improve the magnetic force efficiently. At the bottom of pin armature 36, an extend construction mass holder 34 holds mass 38. External mass 38 is added around the side of center yoke 41 to enhance momentum of vibration force. The weight of mass 38 is used to balance elasticity and damping of mechanical spring 50 to generate the momentum of MEV driver 408. A function of mass holder 34 is to extend the diameter of momentum yoke 4 to have a stable momentum vibration of yoke 41 at the vertically movement.

Figure 4E:
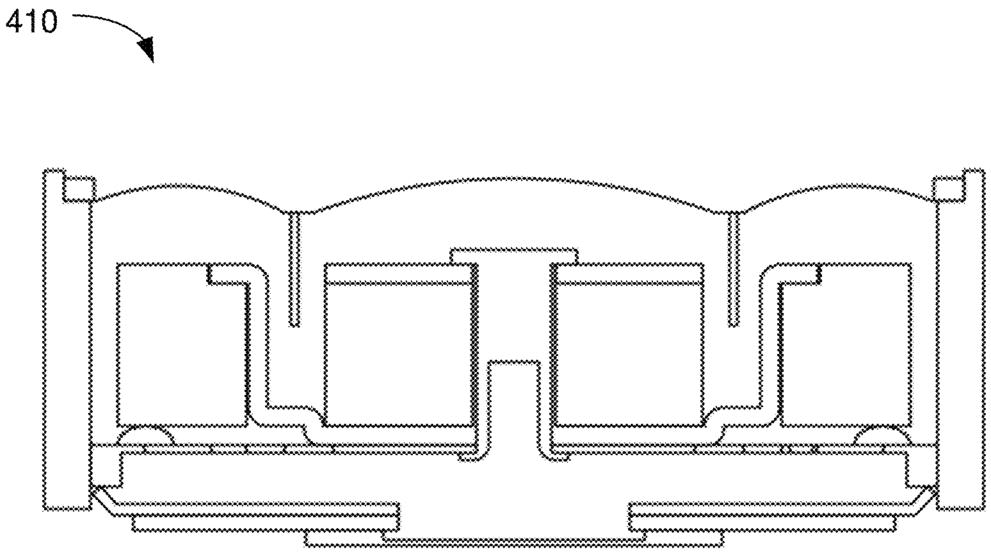

FIG. 4E is a block diagram illustrating downward status of first driver or MEV driver 410 of MAP earphone during performance in accordance with one embodiment of the present invention. In one aspect, MEV driver 410 generates three (3) types of sound outputs. The first audio output is the electro-magnetic audio output generated by the electromagnetic mechanism via the electromagnetic sound generator. The second audio output is the mechanical audio output generated by the mechanical mechanism via a mechanical sound generator. Referring to FIG. 4A, drum plate 39 is configured to hit at the back of momentum yoke 4 to create the mechanical audio. The third mechanical output is the vibration output generated by the mechanical mechanism via the mechanical sound generator. In one example, moving liner vertical vibrator 54 leads the movement of bridge 31 to create the vibration output at MEV driver 410. To generate electromagnetic audio output, mechanical audio output, and vibration output, MEV driver 410, in one embodiment, includes Momentum yoke 4, bridge 31, moving diaphragm 32, enameled voice coil 33, mass holder 34, magnet 35, pin armature 36, pin armature lock 361, printed circuit board 37, mass 38, drum plate 39, yoke 41, audio calibration diaphragm 42, terminal plate 43, power ring 44, magnet cover 45, mechanical spring 50, dust cover 51, yoke seating place 52, spring edge 55, mechanical spring hole 521, spring legs 53, linear vertical vibrator 54.

Referring to FIG. 4A, momentum yoke 4 is positioned at the center of MEV driver 410, which further includes yoke 41 containing pin armature 36, magnet 35, magnet cover 45, pin armature lock 361, and external mass holder 34 and mass 38. Bridge 31 is situated at the outer plastic case of MEV driver 410 and is used to connect the electromagnetic sound generator to the mechanical sound generator to allow both generators to work at the same time. Moving diaphragm 32 is situated at the top of MEV driver 400 or 410 for generation of sound via molecule movement in response to activities of electromagnetic sound generator. Enameled voice coil 33 situated underneath moving diaphragm 32 is capable of carrying electric current from electrical signal input via connecting cable 121 shown in FIG. 1. Mass holder 34 is configured to extend itself from the yoke 41. Note that mass holder 34 is configured to hold and extend to the side of yoke 41 to the center of momentum yoke 4. Magnet 35 is located at the center and/or surround pin armature 36. Magnet 35 creates a magnetic field based on the current flow generated by the electrical signal input. The electro-magnetic sound generator is configured to induce an electro-magnetic force facilitating a movement of moving diaphragm 32 resulting electro-magnetic audio output. Pin armature 36 is located at the center part of yoke 4 for supporting the frame for holding magnet 35. Pin armature lock 361 is located at the bottom of momentum yoke 4 and is used to lock momentum yoke 4 at yoke seating place 52 for facilitating generation of vibration together with linear vertical vibrator 54. Printed circuit board 37 is located at the bottom of MEV driver 400 or 410 wherein it is used to connect the electrical signal input to enameled voice coil 33 as well as the audio driver. Mass 38 is located at the end of mass holder 34 for providing weight around center of momentum yoke 4. A function of this is to increase the momentum and stability of momentum yoke 4 while it has an up-and-down motion. Drum plate 39 is located at the side of linear vertical vibrator 54 and attached at bridge 31. A function of drum plate 39 is to let the bottom of momentum yoke 4 to hit an area for generating the mechanical audio output. Yoke 41 is located at the center of MEV driver 410 wherein it includes pin armature 36, magnet 35, magnet cover 45, and pin armature lock 361. Audio calibration diaphragm 42, located at the bottom of MEV driver 410, is configured to control air flow into internal of MEV driver 410 for adjusting audio frequency characteristics. Terminal plate 43, as shown in FIG. 5D, is located on printed circuit board 37.

Figure 5A:
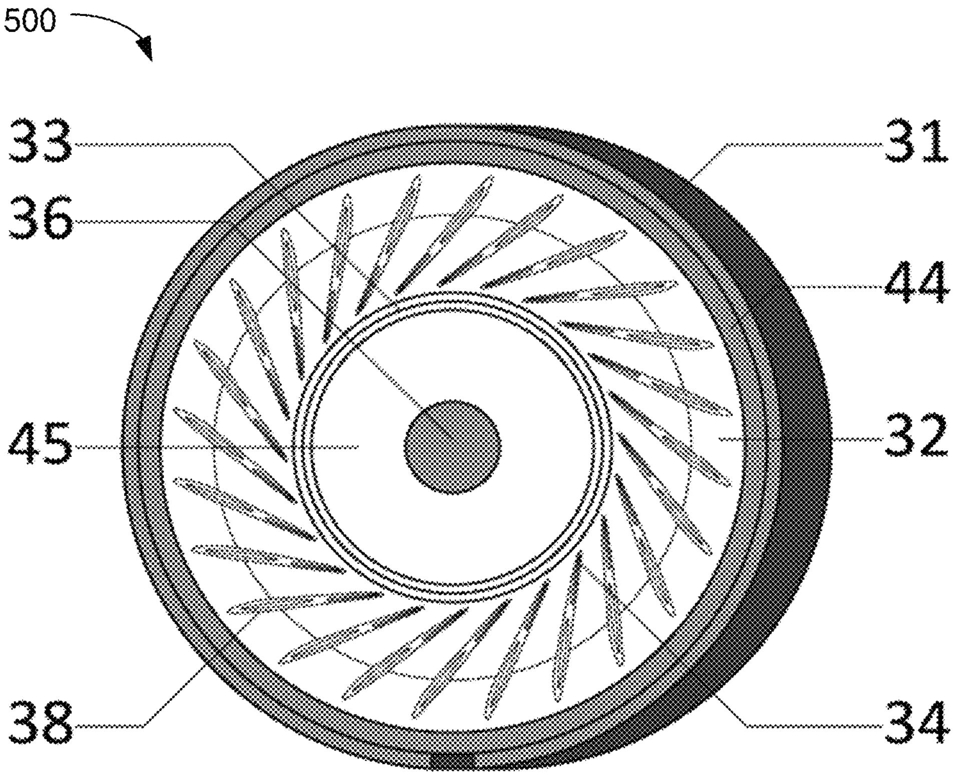
FIGS. 5A-5D are diagrams illustrating top views of driver in accordance with one embodiment of the present invention.
Figure 5B:
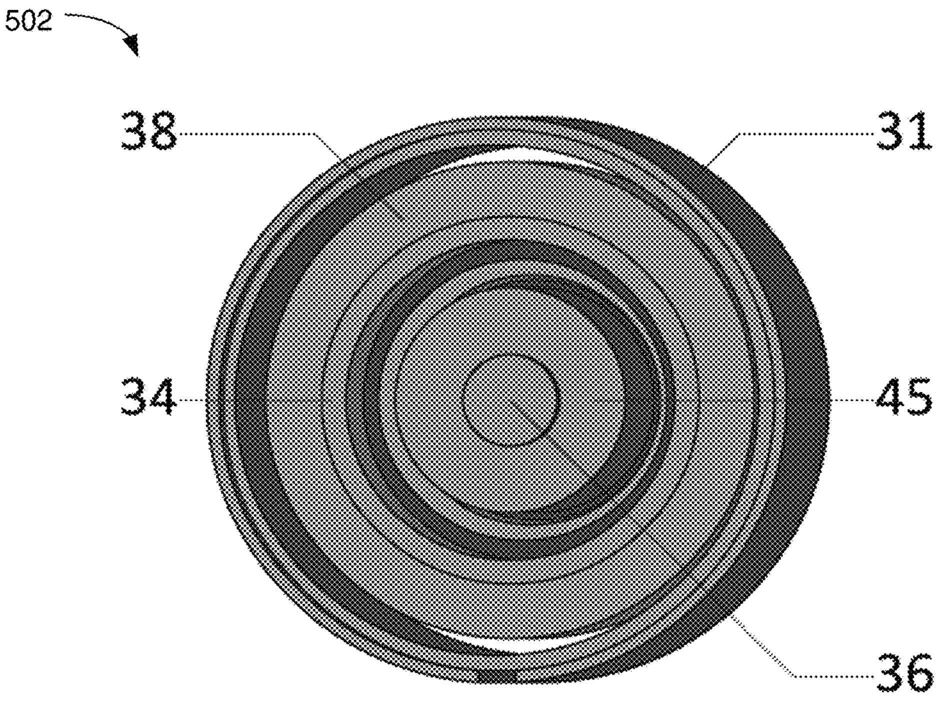
Figure 5C:
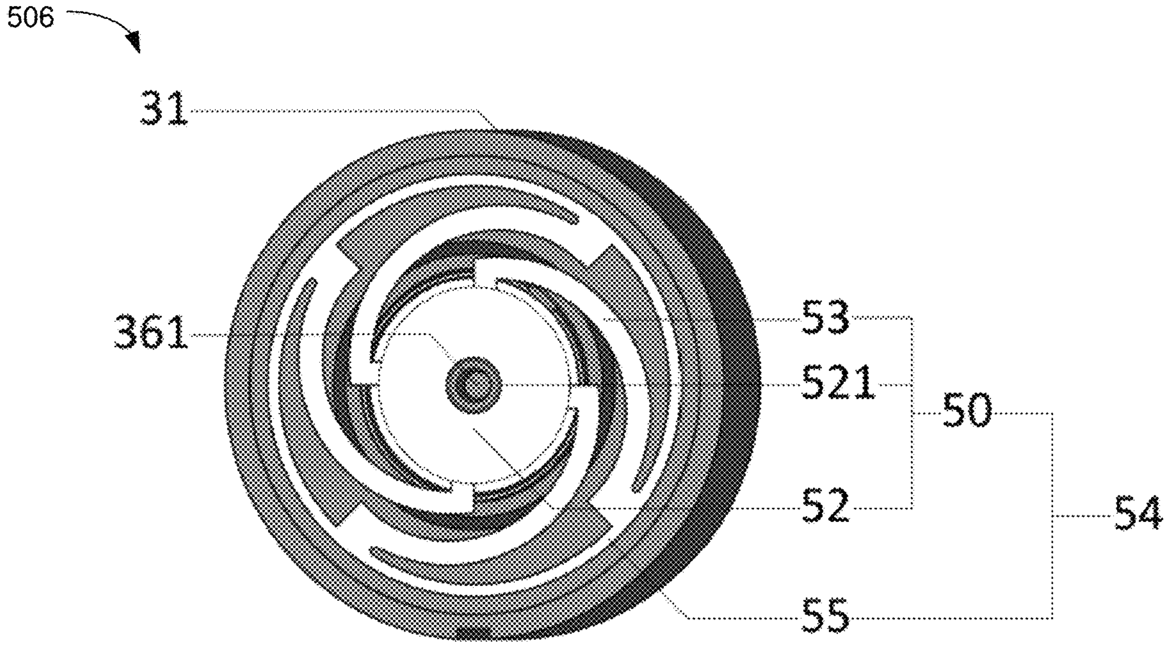
Figure 5D:
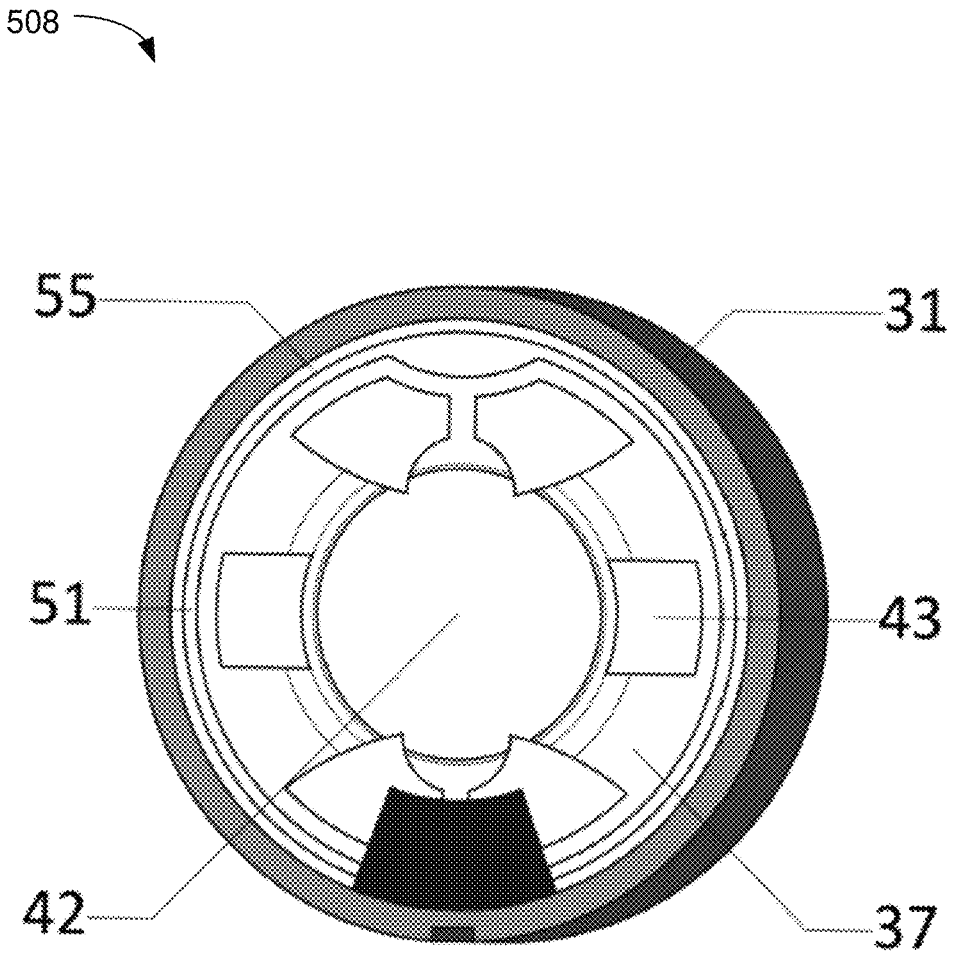

FIG. 5A is a diagram illustrating a top view of mechanical-electromagnetic-vibration ("MEV") driver 500 of MAP earphone driver in accordance with one embodiment of the present invention. FIG. 5B is a diagram illustrating a top view of momentum yoke in MEV driver 502 of MAP earphone driver in accordance with one embodiment of the present invention. FIG. 5C is a diagram illustrating a top view of linear vertical vibrator in MEV driver 506 in accordance with one embodiment of the present invention. It should be noted that the underlying concept of the exemplary embodiment(s) of the present invention would not change if one or more components (circuit or elements) were added to or removed from FIGS. 5A, 5B, 5C.

FIG. 5A shows power ring 44 which is located at the top of MEV driver 500. Power ring 44, configured to surround the edge of moving diaphragm 32, is glued at bridge 31. A function of power ring 44 is to protect at the edge of moving diaphragm 32. Magnet cover 45 is located on the top of magnet 35 at the center of momentum yoke 4. Magnet cover 45 is used to cover and protect magnet 35. Mechanical spring 50, shown in FIG. 5C, is located underneath of momentum yoke 4 and is locked by pin armature lock 361 and mechanical spring hole 521. Mechanical spring 50 includes yoke seating place 52, spring legs 53, and mechanical spring hole 521. Mechanical spring 50 has a drum plate 39 and is attached at bridge 31 at a relatively fixed position. A function of mechanical spring 50 is to control the vertical vibration movement of the MAP earphone. Dust cover 51, shown in FIG. 5D, is located at the bottom of MEV driver 508 and is covered by printed circuit board 37. Dust cover 51 is attached at the side of bridge 31. The center hole is covered by audio calibration diaphragm 42. A function of Dust cover 51 is to prevent the dust into the internal construction of MEV driver 508. Yoke seating place 52 is located at the top of linear vertical vibrator 54 which is the placement for momentum yoke 4 and locked by pin armature lock 361 via mechanical spring hole 521. Mechanical spring hole 521 is located at the center of mechanical spring 50 and is a hole fit for the size of pin armature lock 361 which is used to lock momentum yoke 4. Spring legs 53 are located at mechanical spring 50 and extended to yoke seating place 52 wherein spring legs are used to extend the drum plate 39. A function of spring legs 53 is to create an elastic spring function for momentum yoke 4 and linear vertical vibrator 54 for facilitating mechanical audio output and the vibration output. Linear vertical vibrator 54 is located below momentum yoke 4 which is locked by pin armature lock 361 through mechanical spring hole 521.

Linear vertical vibrator 54, as shown in FIG. 4A, is able to generate two (2) types of audio outputs. The first type of audio output is the mechanical audio output and the second type of audio output is the vibration output. The mechanical audio output, in one example, is generated by linear vertical vibrator 54 via hitting on the drum plate 39 to produce the mechanical sound. The vibration output is created from the vibration generated by the movement of momentum yoke 4 as well as facilitating the movement of linear vertical vibration 54. It should be noted that the vibrating movement of ups and downs of the earpiece will contact the ear cartilage. The action of rubbing and/or contacting ear cartilage transmits signals to the brain creating a sound illusion.

In one embodiment, the electromagnetic sound generator is coupled to the mechanical sound generator by bridge 31 and momentum yoke 4 as the common part. It should be noted that it is important to have both generators working simultaneously. To control the number of spring legs 53 with an angle as illustrated in FIG. 4A reaching from the bottom of mechanical spring hole 521 as shown in FIG. 5C. The external mass holder is used to hold the mass for increasing stability of moving pin armature 36 when it moves in vertical movements. As shown in FIG. 5B, external mass holder 34 has a smaller diameter so that it provides gap control during the vertical movement of momentum yoke 4. We will measure the induced electromagnetic force generated from the electromagnetic sound generator (1) that can be measured. Elasticity force of mechanical spring 50, as shown in FIG. 5C, includes the mass of momentum yoke 4.

FIG. 5D is a diagram illustrating a bottom view of MEV driver 508 in accordance with one embodiment of the present invention. The electrical audio input, in operation, is the same or substantially the same for the left receiver and the right receiver of MAP earphone. When the electrical audio input is coupled to terminal plate 43 of printed circuit board 37 in MEV driver 508, the electrical audio input is fed to enameled voice coil 33 and subsequently passes onto the audio driver. It should be noted that a frequency response after 1500 Hz can be tuned by audio calibration diaphragm 42.

The diameter of fixed mass 38 near mass holder 34, as shown in FIG. 5A and FIG. 5B, is smaller than the diameter of bridge 31 whereby it creates a gap for facilitating free movement in vertical direction. It should be noted that the energy can be lost from non-vertical movement. FIG. 5C illustrates a thickness of mechanical spring 50, number of spring legs 53, thickness of spring legs 53, and pattern of mechanical spring 50 for facilitating control of spring force. Note that longer and thinner of spring legs 53 can provide additional elasticity for MEV driver 506. The number of spring legs 53 can also affect the balance of moving pin armature 36. In one example, the length of spring legs 53 is configured to control angle(s) of construction of drum plate 39 as shown in FIG. 4A. Note that the distance between spring legs 53 and drum plate 39 will affect the sound output(s) in connection to efficiency of mechanical hit.

Figure 6A:
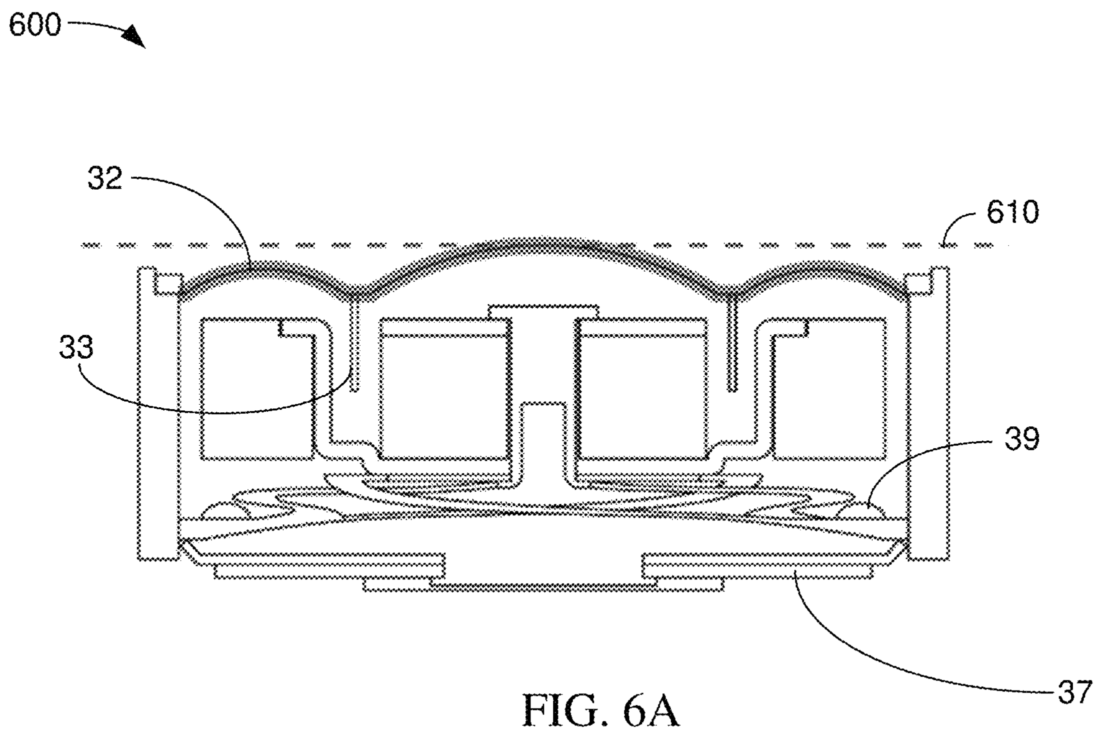
FIGS. 6A-6B are diagrams illustrating audio output generated by an electromagnetic sound generator and mechanical sound generator in accordance with one embodiment of the present invention in accordance with one embodiment of the present invention.

FIG. 6A is a diagram illustrating audio output generated by an electromagnetic sound generator in MEV driver 600 in accordance with one embodiment of the present invention in accordance with one embodiment of the present invention. MEV driver 600 includes a moving diaphragm 32, enameled voice coil 33, and drum plate(s) 39. A reaction flow indicated by dotted line 610 illustrates a movement of diaphragm 32 during operation. It should be noted that the underlying concept of the exemplary embodiment(s) of the present invention would not change if one or more components (circuit or elements) were added to or removed from FIG. 6A. An electrical audio input, in one embodiment, is fed to printed circuit board 37 which continues to feed input signals to various components including one or more audio drivers.

Figure 6B:
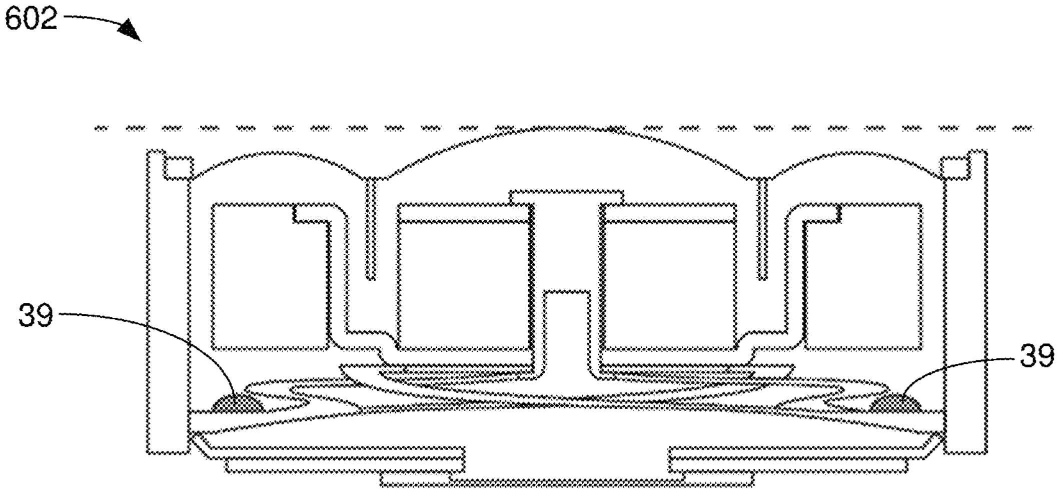

FIG. 6B is a diagram illustrating audio output generated by mechanical sound generator in MEV driver 602 in accordance with one embodiment of the present invention in accordance with another embodiment of the present invention. MEB driver 602 includes a moving diaphragm, enameled voice coil, and drum plate(s) 39. Drum plates 39 is used to facilitate generation of mechanical output. It should be noted that the underlying concept of the exemplary embodiment(s) of the present invention would not change if one or more components (circuit or elements) were added to or removed from FIG. 6B.

Figure 7A:
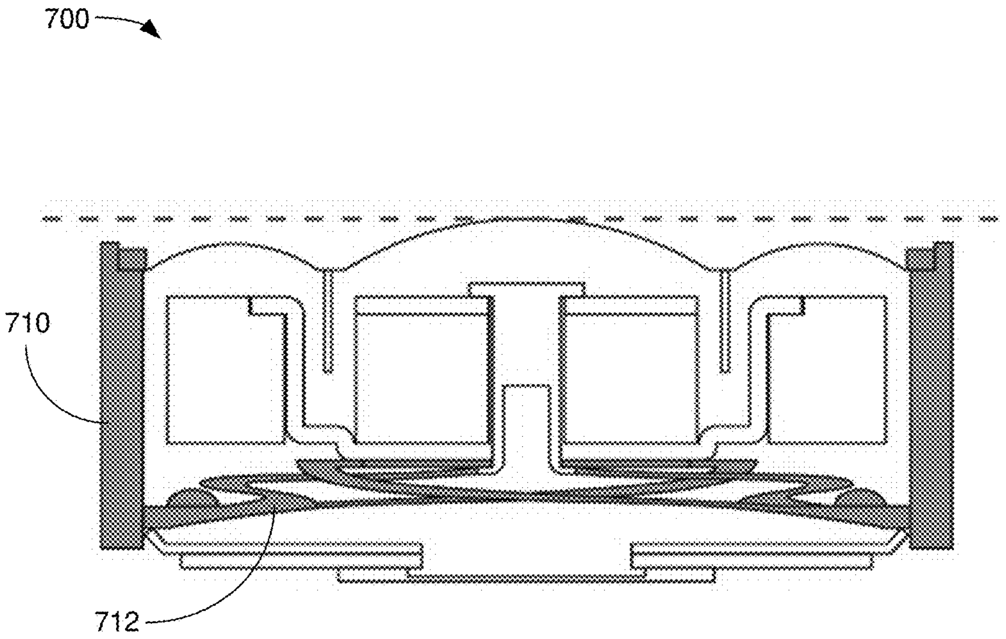
FIG. 7A are diagrams illustrating vibration audio output generated by the mechanical sound generator and/or electromagnetic sound generator in accordance with one embodiment of the present invention in accordance with one embodiment of the present invention.

FIG. 7A is a diagram illustrating vibration audio output generated by a mechanical sound generator in MEV driver 700 in accordance with one embodiment of the present invention in accordance with another embodiment of the present invention. MEV driver 700 includes bridge vibration component 710 and mechanical spring component 712 for facilitating generation of vibration output. In one embodiment, bridge vibration component 710 includes bridge 31 and power ring 44 shown in FIG. 4A. Mechanical spring component 712 includes drum plates 39, mechanical spring 50 as shown in FIG. 4A. It should be noted that the underlying concept of the exemplary embodiment(s) of the present invention would not change if one or more components (circuit or elements) were added to or removed from FIG. 7A.

Figure 7B:
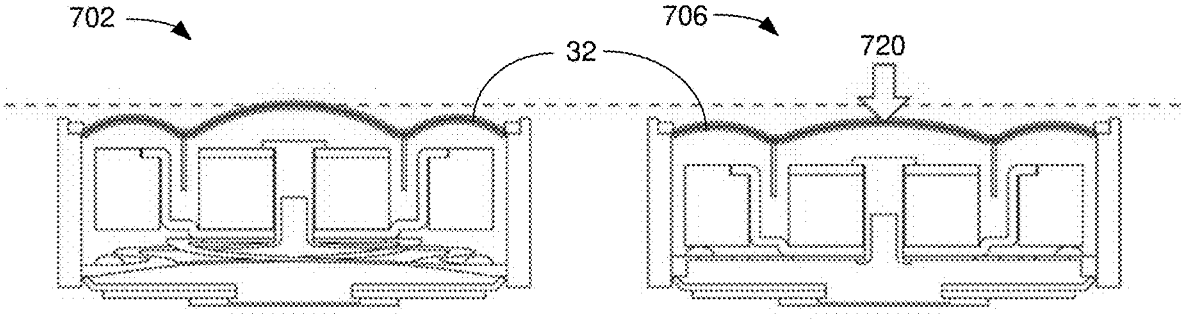
FIG. 7B is a set of diagrams illustrating electro-magnetic audio output generated by electromagnetic sound generator in accordance with one embodiment of the present invention in accordance with one embodiment of the present invention.

FIG. 7B is a diagram illustrating an MEV driver 702 or 706 providing reaction follow of electromagnetic audio output generated by an electromagnetic sound generator in accordance with one embodiment of the present invention in accordance with one embodiment of the present invention. MEV driver 702 or 706 is capable of producing one of three audio outputs using an electromagnetic mechanism generated by the electromagnetic sound generator. It should be noted that the underlying concept of the exemplary embodiment(s) of the present invention would not change if one or more components (circuit or elements) were added to or removed from FIG. 7B.

FIG. 7B, in one embodiment, illustrates a movement of moving diaphragm 32 as a reaction flow of electromagnetic audio output as indicated by arrow 720. Upon receipt of audio input signals at printed circuit board 37, a current flow in one direction is guided by a magnetic field generated by the magnet(s). The movement of moving diaphragm 32 will move upward or downward depends on the direction of the current flow. For example, when the current flow is in a negative direction, direction of the electro-magnetic force may change to assist current flow direction. It should be noted that the up and down motion of moving diaphragm 32 can push air molecules to transmit sound as an audio output. It should be noted that different frequency of electric audio input can make different currents in the MAP earphone because different frequencies facilitate different sound pressure levels.

Figure 8:
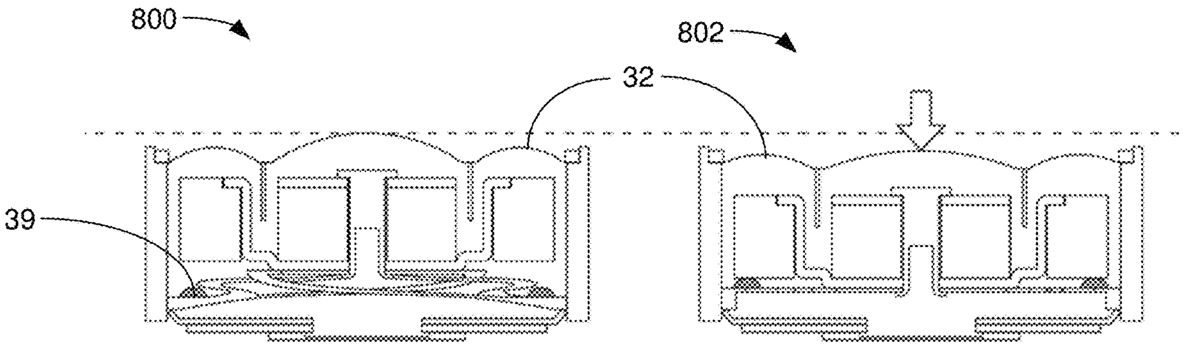
FIGS. 8-9 are diagrams illustrating mechanical audio and/or vibration audio output generated by mechanical sound generator in accordance with one embodiment of the present invention in accordance with one embodiment of the present invention.

FIG. 8 is a diagram illustrating a reaction flow of mechanical audio output generated by mechanical sound generator within MEV driver 800 or 802 in accordance with one embodiment of the present invention in accordance with another embodiment of the present invention. MEV driver 800 or 802, similarly to MEB driver 602 shown in FIG. 6B, includes a moving diaphragm, enameled voice coil, and drum plate(s) 39. Drum plates 39 is used to facilitate generation of mechanical output. The mechanical output, in one aspect, is generated by hitting drum plate 39 on momentum yoke 4 by generating a pushing motion of bridge 31, as shown in FIG. 4A, to create the mechanical as well as vibration sound output. Note that the movement of moving diaphragm 32 induces the vibration output and the mechanical audio output. It should be noted that the underlying concept of the exemplary embodiment(s) of the present invention would not change if one or more components (circuit or elements) were added to or removed from FIG. 8.

Figure 9:
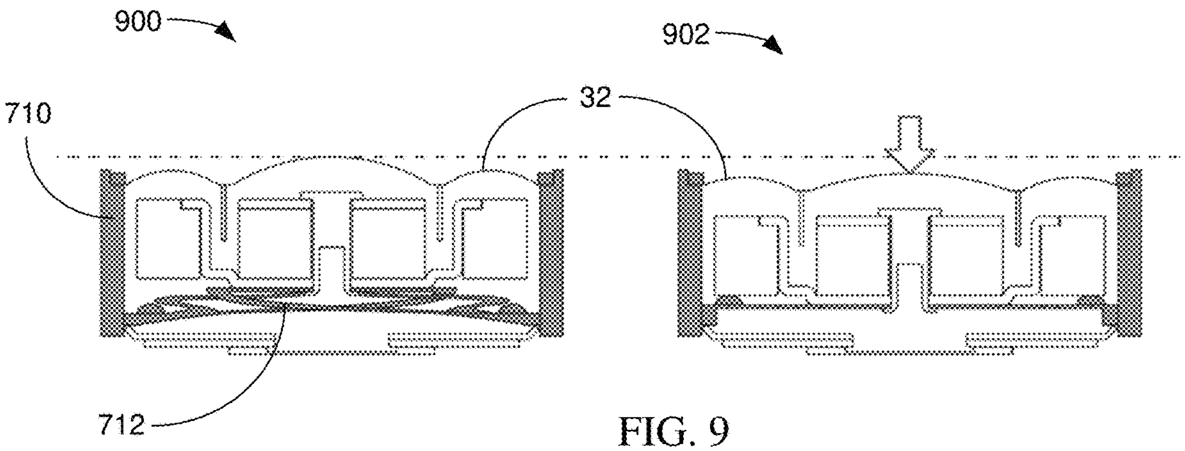

FIG. 9 is a diagram illustrating a reaction flow of vibration audio output generated by mechanical sound generator within MEV driver 900 or 902 in accordance with one embodiment of the present invention in accordance with another embodiment of the present invention. It should be noted that an audio output starts from the motion of moving diaphragm 32 which induces an electro-magnetic force, pushing on momentum yoke 4, leading to the vibration of linear vertical vibrator 54, as shown in FIG. 4A. The mechanical audio output is generated until the falling momentum yoke 4 hitting on drum plate 39. It should be noted that the underlying concept of the exemplary embodiment(s) of the present invention would not change if one or more components (circuit or elements) were added to or removed from FIG. 9.

MEV driver 900 or 902, in one example, uses a mechanical sound generator to facilitate generation of vibration output. In operation, when moving diaphragm 32 is in motion, the electromagnetic sound generator is used to induce an electro-magnetic force. The motion of moving diaphragm 32, for example, will lead the movement of enameled voice coil 33 under the magnetic field from magnet 35 to react on momentum yoke 4, as illustrated in FIG. 4A. Momentum yoke 4 is configured to be a free-floating mechanism which is locked at linear vertical vibrator 54 and a side of bridge 31. When moving diaphragm 32 vibrates upwards and downwards, the motion translates motion of momentum yoke 4, linear vertical vibrator 54, and bridge 31. The force acting on bridge 31 will subsequently provide the vibration output of the MAP earphone. Note that the weight and construction of momentum yoke 4 is related to response, vibration amplitude, and resonant frequency. The rebound of momentum yoke 4 from the electromagnetic force will react against the elasticity of mechanical spring 50 in linear vertical vibrator 54. The resonant frequency and vibration amplitude of the MAP earphone are related to the design and parameter of all the components in the MAP earphone.

Figure 10A:
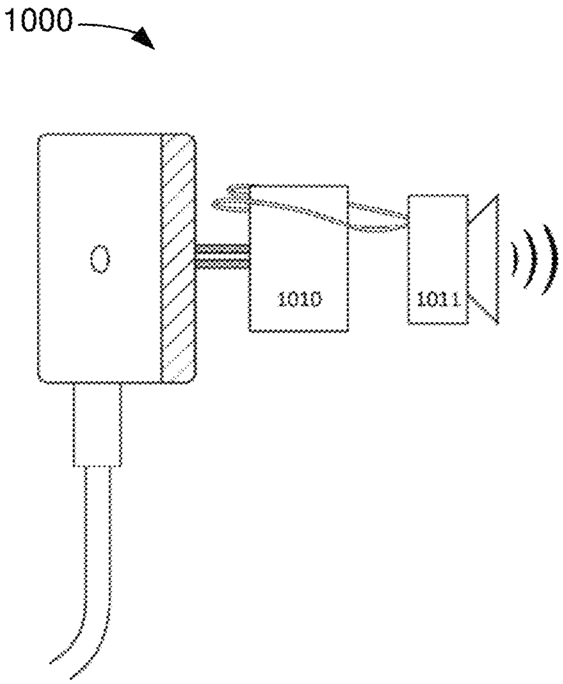
FIGS. 10A-10B are diagrams illustrating second drive or drivers of the MAP earphone in accordance with one embodiment of the present invention in accordance with one embodiment of the present invention.

FIG. 10A is a diagram 1000 illustrating a single first MEV driver 1010 and single audio device 1011 of the MAP earphone in accordance with one embodiment of the present invention in accordance with one embodiment of the present invention. One embodiment of invention illustrates a single MEV driver 1010 coupling to one audio drivers 1011 and an MEV driver in accordance with one embodiment of the present invention in accordance with one embodiment of the present invention. It should be noted that the underlying concept of the exemplary embodiment(s) of the present invention would not change if one or more components (circuit or elements) were added to or removed from FIG. 10A.

Audio driver 1011, also known as second audio devices, can be constructed according to an electromagnetic type, piezoelectric type, dynamic type, mechanical type, and/or armature type audio devices. It should be noted that the MEV driver of MAP earphone contains a free-floating momentum yoke which is not fixed in position, and some of energy passes to the mechanical spring during the motion. The frequency response curve of MEV driver from the electromagnetic sound generator has a lower sound pressure level at middle range frequency or at high range frequency. One of the important features of audio driver 1011 is to compensate the performance of lower sound pressure level at the middle and/or high frequency range.

Figure 10B:
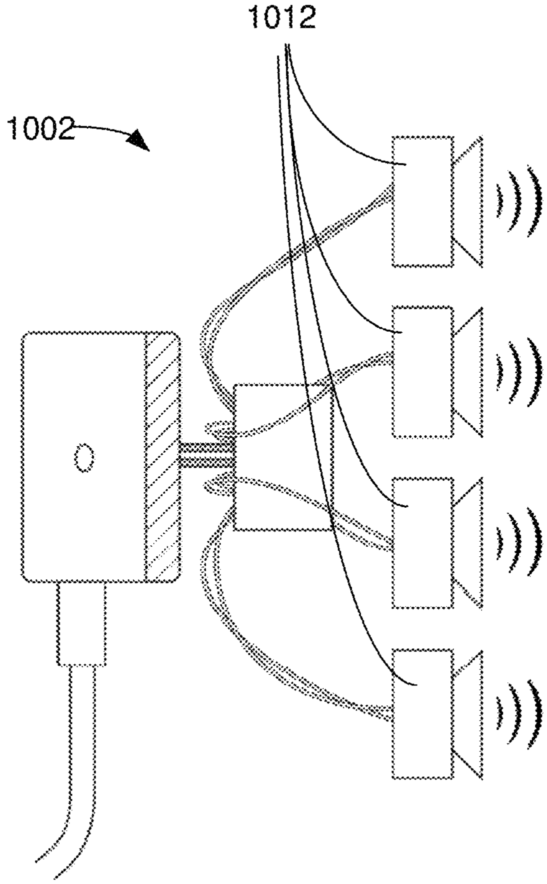

FIG. 10B is a diagram 1002 illustrating multiple audio drivers 1012 of MAP earphone in accordance with one embodiment of the present invention in accordance with another embodiment of the present invention. Diagram 1002 is similar to diagram 1000, shown in FIG. 10A, except for additional audio drivers that are added to produce a full range of frequency characteristic to optimize the audio sound output(s). In one embodiment, the number of audio drivers used is a matching function with the MEV driver as well as the applications. It should be noted that the audio sound output by audio driver(s) is an important or large portion of total audio outputs. It should be noted that the underlying concept of the exemplary embodiment(s) of the present invention would not change if one or more components (circuit or elements) were added to or removed from FIG. 10B.

Figure 11:
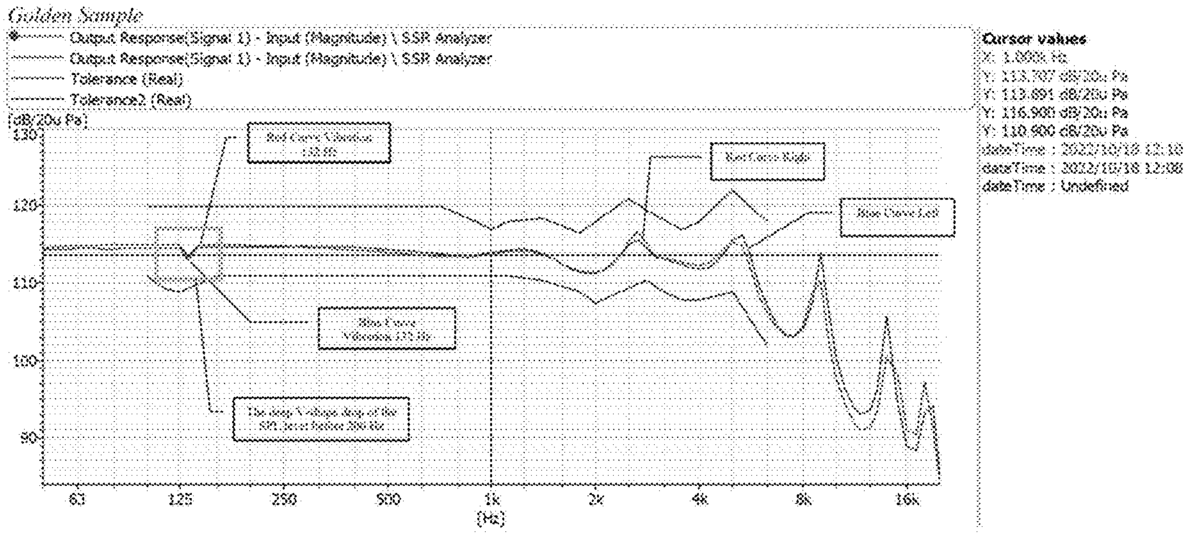
FIG. 11 is a chart illustrating frequency response curve and vibration response curve associated to MAP earphone in accordance with one embodiment of the present invention in accordance with one embodiment of the present invention.

FIG. 11 is a chart 1100 illustrating several frequency response curves of audio output relating to MAP earphone in accordance with one embodiment of the present invention in accordance with another embodiment of the present invention. Chart 1100 shows audio frequency response curve of MAP earphone containing information relating to response signal and tolerance(s). The frequency response curve combines audio outputs from all drivers to form the audio frequency characteristics. From chart 1100, the frequency response curve shows audio frequency characteristics having deep V-shape drops of sound pressure level around or before 200 hertz ("Hz"). The deep V-shape drop of the sound pressure level before 200 Hz, in one example, comes from an energy transfer from the electromagnetic sound generator to the mechanical sound generator. The deep V-shape drop frequency point below 200 Hz can be controlled based on the applications and/or control requirement. It should be noted that the transferred energy brings up the movement of the momentum yoke and the linear vertical vibrator in the mechanical sound generator.

Figure 12:
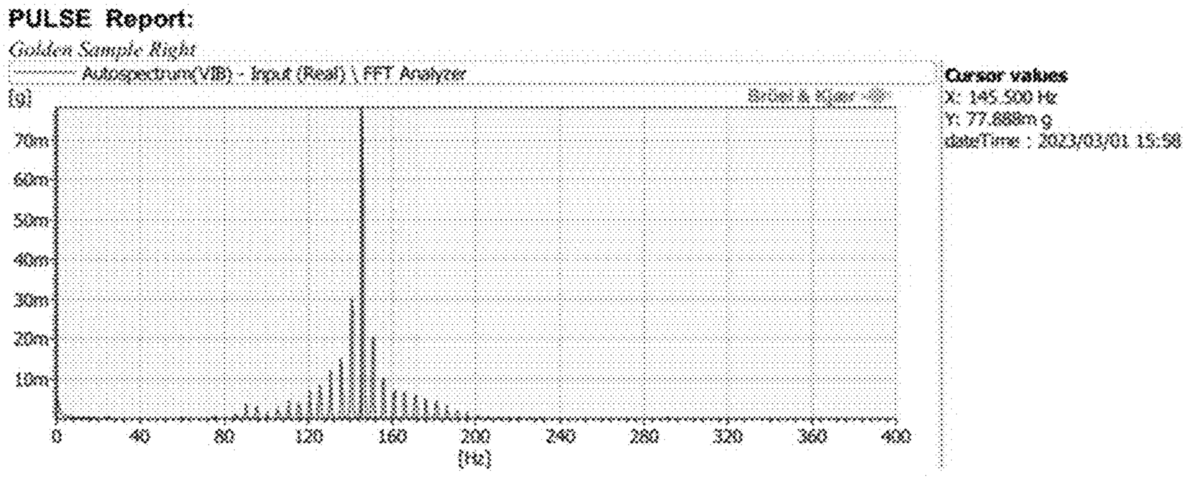
FIG. 12 is a chart illustrating vibration response curve associated to vibration audio output generated by MAP earphone in accordance with one embodiment of the present invention in accordance with one embodiment of the present invention.

FIG. 12 is a chart 1200 illustrating vibration amplitude associated to vibration audio output generated by the MAP earphone in accordance with one embodiment of the present invention in accordance with one embodiment of the present invention. In operation, after arrival of electrical audio input, the electro-magnetic sound system or electromagnetic sound generator activates a movement of the moving diaphragm in response to induce electro-magnetic force. The motion of the moving diaphragm induces the electro-magnetic force applied to the momentum yoke which leads to the motion of the linear vertical vibrator. Due to the fixture of the linear vertical vibrator at the bridge, the motion produces a vibration output from the MAP earphone. Chart 1200 shows total vibration energy of MAP earphone around 80-200 Hz. It should be noted that the minimum vibration amplitude is set up at the resonant frequency 20 mg when input voltage is 0.126 Vrms. Chart 1102 illustrates that minimum vibration amplitude of the MAP earphone and the rubbing frequency should be between 80-200 Hz as shown in FIG. 12.

FIG. 12 is a chart 1200 illustrating vibration response curve associated to vibration audio output generated by the MAP earphone in accordance with one embodiment of the present invention in accordance with one embodiment of the present invention. Chart 1200 illustrates a vibration frequency range between 80-200 Hz. Chart 1200 also shows the maximum vibration amplitude at the resonant frequency (around 140 Hz) for the MAP earphone. It should be noted that 140 Hz is approximately in the middle of 80 and 200 Hz. The vibration output is configured to transmit sound signals to the brain via a newly discovered auditory system using different frequencies and amplitudes. Different frequencies and amplitudes create different effects on rubbing the cartilage of the ear canal to transmit different frequencies of audio. It should be noted that a vibration frequency within 80-200 Hz includes the sub-woofer bass range, which enhances the bass feeling. In one embodiment, the vibration amplitude is a factor to generate sound illusion. For example, the minimum amplitude level of vibration is 20 mg under the input of 0.126 root mean square voltage ("Vrms"), and it varies based on different input voltages. The vibration will create the rubbing process on the surface of the cartilage in the ear canal and create the sound illusion output of the audio signal to the brain (the effect of the vibration) which is a secondary pathway of the auditory system.

The exemplary embodiment of the present invention includes various processing steps, which will be described below. The steps of the embodiment may be embodied in machine or computer-executable instructions. The instructions can be used to cause a general-purpose or special-purpose system, which is programmed with the instructions to perform the steps of the exemplary embodiment of the present invention. Alternatively, the steps of the exemplary embodiment of the present invention may be performed by specific hardware components that contain hard-wired logic for performing these steps, or by any combination of programmed computer components and custom hardware components.

Figure 13:
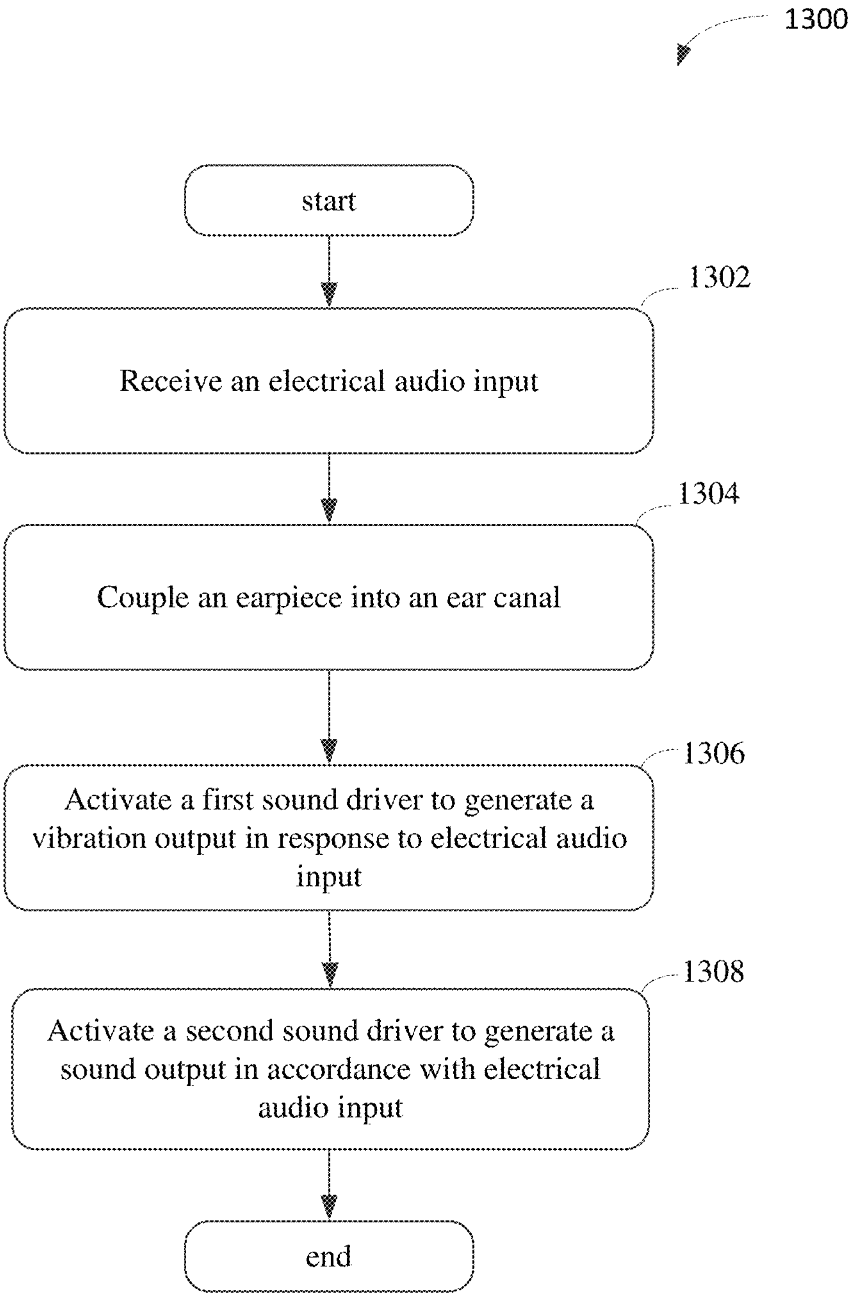
FIG. 13 is a flowchart illustrating a process a MAP earphone uses to convert electrical signals into different outputs through different pathways in accordance with one embodiment of the present invention.

FIG. 13 is a flowchart 1300 illustrating a process of converting electrical signals to audio sound for different outputs by a MAP earphone in accordance with one embodiment of the present invention. At block 1302, the process receives an electrical audio input from an external host system. In one example, the process is capable of receiving wireless audio input via a wireless network. Alternatively, the process may also receive audio input via a cable connected to an external system.

At block 1304, an earpiece of a MAP earphone is coupled or plugged into an ear canal for providing audio sound. In one example, a MAP earphone includes a left receiver and a right receiver wherein each receiver includes one earpiece.

At block 1306, a first sound driver, also known as MEV driver, is activated to generate a vibration output in response to the electrical audio input for facilitating generation of audio hearing for a user through the first auditory pathway via at least a portion of ear cartilage. In one embodiment, the first auditory pathway is a new auditory system that may be perceived by a deaf or hearing-impaired person. The process is also able to generate electromagnetic audio sound. Alternatively, the process can generate mechanical audio sound.

At block 1308, the process activates a second sound driver, also known as an audio driver, to generate a sound output in accordance with the electrical audio input for facilitating generation of the audio that may be perceived through a second auditory pathway via the user's ear drum. The process is further capable of applying motion of vibration, rubbing against a portion of ear cartilage to facilitate audio hearing via the first auditory pathway.

Figure 14:
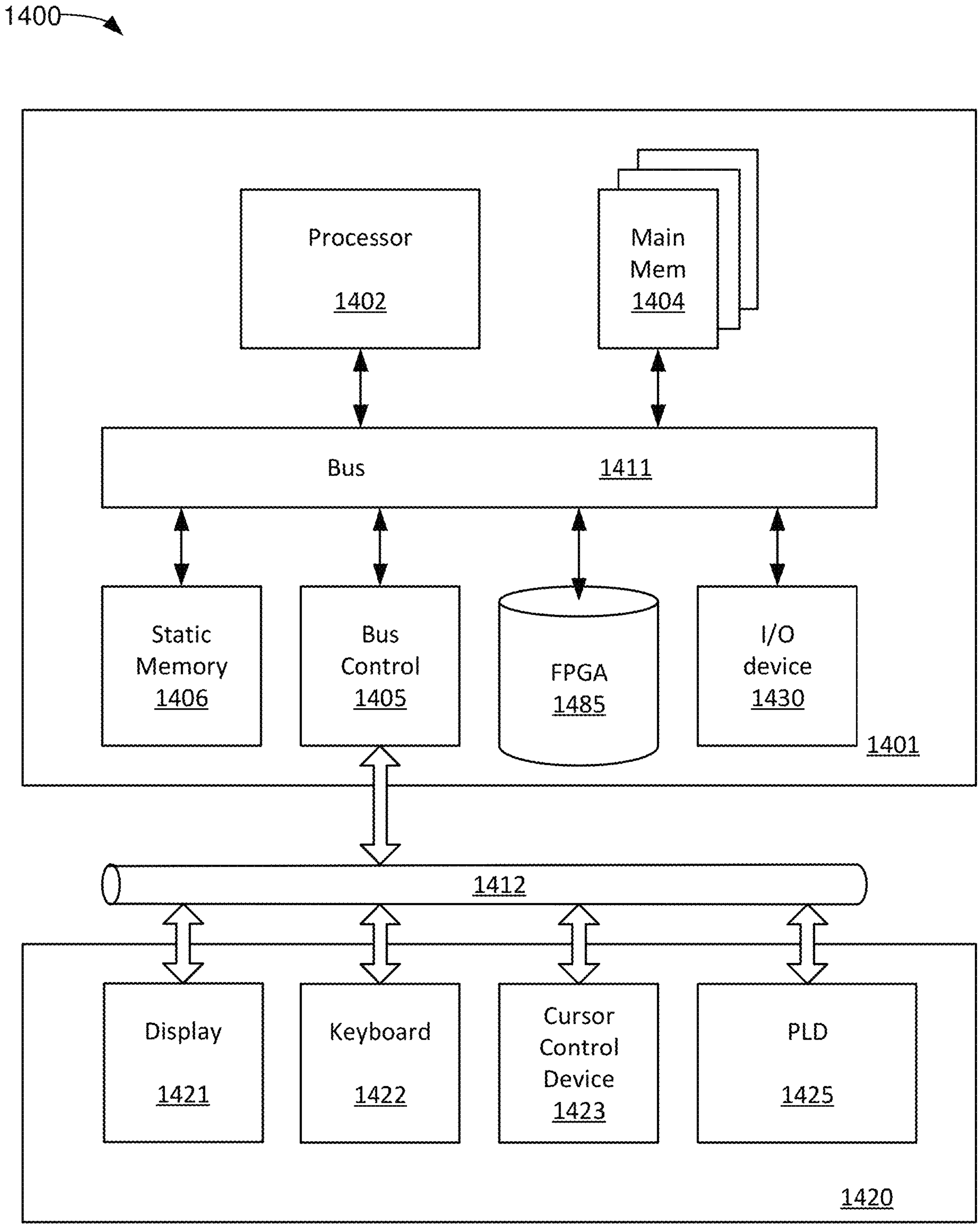
FIG. 14 is a diagram illustrating a digital processing system relating to one or more MAP earphones in accordance with one embodiment of the present invention.

FIG. 14 is a diagram illustrating a digital processing system or computer system 1400 relating to one or more MAP earphones in accordance with one embodiment of the present invention. In one aspect, the digital processing system can be embedded in MAP earphone for performing additional functions such as remote communications, network communications, and data storage. Alternatively, the digital processing system can be an external system providing electrical audio signals to MAP earphone. Computer system 1400 includes a processing unit 1401, an interface bus 1412, and an input/output ("IO") unit 1420. Processing unit 1401 includes a processor 1402, main memory 1404, system bus 1411, static memory device 1406, bus control unit 1405, I/O element 1430, and FPGA 1485. It should be noted that the underlying concept of the exemplary embodiment(s) of the present invention would not change if one or more blocks (circuit or elements) were added to or removed from FIG. 14.

Bus 1411 is used to transmit information between various components and processor 1402 for data processing. Processor 1402 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, Ryzen™, AMD® family processors, or Power PC™ microprocessor.

Main memory 1404, which may include multiple levels of cache memories, stores frequently used data and instructions. Main memory 1404 may be RAM (random access memory), MRAM (magnetic RAM), or flash memory. Static memory 1406 may be a ROM (read-only memory), which is coupled to bus 1411, for storing static information and/or instructions. Bus control unit 1405 is coupled to buses 1411-1412 and controls which component, such as main memory 1404 or processor 1402, can use the bus. Bus control unit 1405 manages the communications between bus 1411 and bus 1412. Mass storage memory or SSD which may be a magnetic disk, an optical disk, hard disk drive, floppy disk, CD-ROM, and/or flash memories are used for storing large amounts of data.

I/O unit 1420, in one embodiment, includes a display 1421, keyboard 1422, cursor control device 1423, and PLD 1425. Display device 1421 may be a liquid crystal device, cathode ray tube ("CRT"), touch-screen display, or other suitable display device. Display 1421 projects or displays images of a graphical planning board. Keyboard 1422 may be a conventional alphanumeric input device for communicating information between computer system 1400 and computer operator(s). Another type of user input device is cursor control device 1423, such as a conventional mouse, touch mouse, trackball, or other type of cursor for communicating information between system 1400 and user(s).

Computer system 1400 may be coupled to various servers via a network infrastructure as illustrated in the following discussion.

Figure 15:
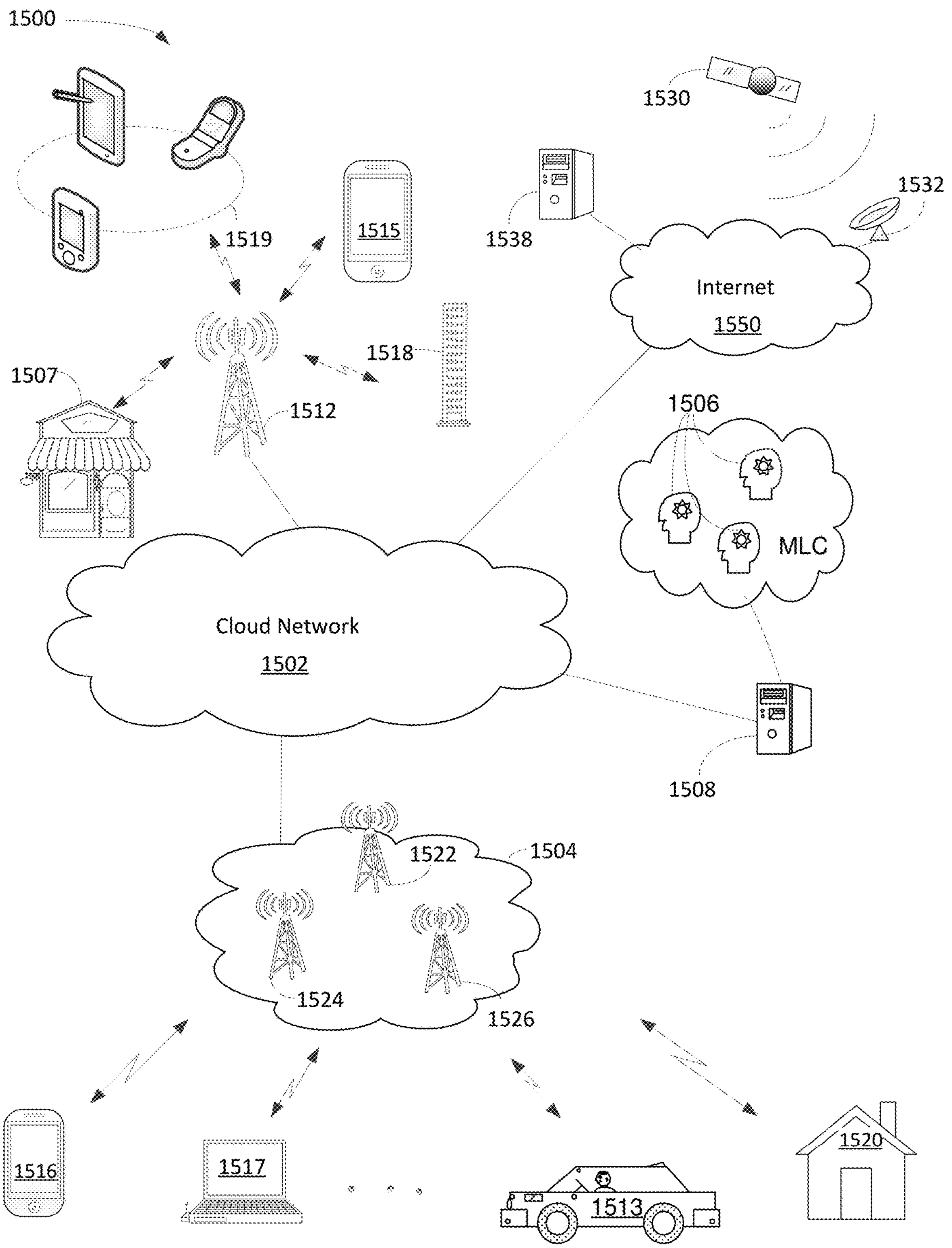
FIG. 15 is a diagram illustrating a cloud-based system environment using one or more MAP earphones in accordance with one embodiment of the present invention.

FIG. 15 is a diagram 1500 illustrating a cloud-based system environment using one or more MAP earphones in accordance with one embodiment of the present invention. Diagram 1500 illustrates AI server 1508, communication network 1502, switching network 1504, Internet 1550, and portable electric devices 1513-1519. In one aspect, PSD or WAP having various WCBs can be used in AI server, portable electric devices, and/or switching network. Network or cloud network 1502 can be wide area network ("WAN"), metropolitan area network ("MAN"), local area network ("LAN"), satellite/terrestrial network, or a combination of WAN, MAN, and LAN. It should be noted that the underlying concept of the exemplary embodiment(s) of the present invention would not change if one or more blocks (or networks) were added to or removed from diagram 1500.

Network 1502 includes multiple network nodes, not shown in FIG. 15, wherein each node may include mobility management entity ("MME"), radio network controller ("RNC"), serving gateway ("S-GW"), packet data network gateway ("P-GW"), or Home Agent to provide various network functions. Network 1502 is coupled to Internet 1550, AI server 1508, base station 1512, and switching network 1504. Server 1508, in one embodiment, includes machine learning computers ("MLC") 1506.

Switching network 1504, which can be referred to as packet core network, includes cell sites 1522-1526 capable of providing radio access communication, such as 3G (3rd generation), 4G, 5G, or 6G cellular networks. Switching network 1504, in one example, includes IP and/or Multiprotocol Label Switching ("MPLS") based network capable of operating at a layer of Open Systems Interconnection Basic Reference Model ("OSI model") for information transfer between clients and network servers. In one embodiment, switching network 1504 is logically coupling multiple users and/or mobiles 1516-1520 across a geographic area via cellular and/or wireless networks. It should be noted that the geographic area may refer to a campus, city, metropolitan area, country, continent, or the like.

Base station 1512, also known as cell site, node B, or eNodeB, includes a radio tower capable of coupling to various user equipments ("UEs") and/or electrical user equipments ("EUEs"). The terms UEs and EUEs are referring to the similar portable devices, and can be used interchangeably. For example, UEs or PEDs can be cellular phone 1515, laptop computer 1517, iPhone® 1516, tablets and/or iPad® 1519 via wireless communications. "Handheld device" can also refer to a smartphone, such as iPhone®, BlackBerry®, Android®, and so on. Base station 1512, in one example, facilitates network communication between mobile devices such as portable handheld device 1515 or 1519 via wired and/or wireless communications networks. It should be noted that base station 1512 may include additional radio towers as well as other land switching circuitry.

Internet 1550 is a computing network using Transmission Control Protocol/Internet Protocol ("TCP/IP") to provide linkage between geographically separated devices for communication. Internet 1550, in one example, couples to supplier server 1538 and satellite network 1530 via satellite receiver 1532. Satellite network 1530, in one example, can provide many functions as wireless communication as well as global positioning system ("GPS"). It should be noted that MAP phones can be used in many fields, such as, but not limited to, smartphones 1515-1516, satellite network 1530, automobiles 1513, AI server 1508, business 1507, and homes 1520.

While a particular embodiment of the present invention has been demonstrated and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An apparatus coupled to an external electronic system for converting electrical signals to audio sound, comprising:

an earpiece configured to be inserted into an ear canal for providing audio sound;

a first sound driver coupled to the earpiece and operable to generate a vibration output facilitating first audio hearing of a user through a first auditory pathway via at least a portion of ear cartilage, wherein the first sound driver includes a yoke component, a linear vertical vibrator, a moving diaphragm, and an audio calibration diaphragm for generating a hearing sensation of three-dimensional audio surround sound and ultra-bass effect; and a second sound driver coupled the earpiece and operable to generate a sound output facilitating second audio hearing of the user through a second auditory pathway via user's ear drum.

2. The apparatus of claim 1, wherein the earpiece includes a soft ear adaptor configured to be situated inside of the ear canal against ear cartilage for providing vibrating activities.

3. The apparatus of claim 1, wherein the first sound driver includes an electromagnetic sound generator configured to generate electromagnetic audio.

4. The apparatus of claim 1, wherein the first sound driver includes a mechanical sound generator configured to generate mechanical sound.

5. The apparatus of claim 1, wherein the first sound driver includes a mechanical sound generator configured to facilitate generation of the vibration output.

6. The apparatus of claim 1, wherein the yoke component includes at least one pin armature, magnet, and mass unit for facilitating sound generation.

7. The apparatus of claim 1, wherein the linear vertical vibrator includes at least one pin armature lock, mechanical spring hole, dust cover, and yoke seating place for facilitating sound generation.

8. The apparatus of claim 1, further comprising a receiver configured to receive electrical audio input.

9. The apparatus of claim 8, wherein the receiver is configured to receive wired electrical signal via a cable.

10. The apparatus of claim 8, wherein the receiver is configured to receive wireless electrical signal via a wireless network.

11. The apparatus of claim 1, further comprising an acoustic chamber coupled between the earpiece and the second driver for providing acoustic sound effect.

12. A method for converting electrical signals to audio sound, comprising:

receiving an electrical audio input from an external host system;

coupling an earpiece into an ear canal for providing audio sound;

activating a first sound driver to generate a vibration output in response to the electrical audio input for facilitating generation of audio hearing of a user through a first auditory pathway via at least a portion of ear cartilage, wherein activating the first sound driver includes facilitating to utilize a yoke component, a linear vertical vibrator, a moving diaphragm, and an audio calibration diaphragm for generating a hearing sensation of three-dimensional audio surround sound and ultra-bass effect; and activating a second sound driver to generate a sound output in accordance with the electrical audio input for facilitating generation of the audio hearing of the user through a second auditory pathway via user's ear drum.

13. The method of claim 12, wherein receiving an electrical audio input includes receiving wireless audio input via a wireless network.

14. The method of claim 12, wherein receiving an electrical audio input includes receiving audio input via a cable connected to an external system.

15. The method of claim 12, further comprising applying motion of vibration rubbing against a portion of ear cartilage for facilitating audio hearing via the first auditory pathway.

16. The method of claim 12, wherein activating a first sound driver includes generating electromagnetic audio sound.

17. The method of claim 12, wherein activating a first sound driver includes generating mechanical audio sound.

18. An apparatus for converting electrical signals to audio sound, comprising:

means for receiving an electrical audio input from an external host system;

means for coupling an earpiece into an ear canal for providing audio sound;

means for activating a first sound driver to generate a vibration output in response to the electrical audio input for facilitating generation of audio hearing of a user through a first auditory pathway via at least a portion of ear cartilage, wherein means for activating the first sound driver includes means for providing a yoke component, a linear vertical vibrator, a moving diaphragm, and an audio calibration diaphragm for generating a hearing sensation of three-dimensional audio surround sound and ultra-bass effect; and means for activating a second sound driver to generate a sound output in accordance with the electrical audio input for facilitating generation of the audio hearing of the user through a second auditory pathway via user's ear drum.

19. The apparatus of claim 18, wherein means for receiving an electrical audio input includes means for receiving wireless audio input via a wireless network.

* * * * *